United States Patent
Tsubata

(10) Patent No.: US 8,411,216 B2
(45) Date of Patent: Apr. 2, 2013

(54) ACTIVE MATRIX SUBSTRATE, LIQUID CRYSTAL PANEL, LIQUID CRYSTAL DISPLAY UNIT, LIQUID CRYSTAL DISPLAY DEVICE, TELEVISION RECEIVER, AND ACTIVE MATRIX SUBSTRATE MANUFACTURING METHOD

(75) Inventor: Toshihide Tsubata, Osaka (JP)

(73) Assignee: Sharp Kabushiki Kaisha, Tokyo (JP)

( * ) Notice: Subject to any disclaimer, the term of this patent is extended or adjusted under 35 U.S.C. 154(b) by 234 days.

(21) Appl. No.: 13/060,494

(22) PCT Filed: Jul. 15, 2009

(86) PCT No.: PCT/JP2009/062824
§ 371 (c)(1),
(2), (4) Date: Feb. 24, 2011

(87) PCT Pub. No.: WO2010/024058
PCT Pub. Date: Mar. 4, 2010

(65) Prior Publication Data
US 2011/0141376 A1    Jun. 16, 2011

(30) Foreign Application Priority Data

Aug. 27, 2008  (JP) .................................. 2008-218840
Nov. 26, 2008  (JP) .................................. 2008-301293

(51) Int. Cl.
G02F 1/1343   (2006.01)
H04N 5/50   (2006.01)
H01L 33/08   (2010.01)
H01L 21/00   (2006.01)

(52) U.S. Cl. ............ 349/39; 349/42; 349/187; 349/189; 438/30; 438/34; 348/731; 257/59; 257/E33.053

(58) Field of Classification Search ............... 349/39, 349/41, 42, 56, 139, 140, 141, 142, 143, 349/144, 187; 348/731, E05.097; 438/30, 438/34; 257/59, E33.053
See application file for complete search history.

(56) References Cited

U.S. PATENT DOCUMENTS 6,338,989 B1 *   1/2002   Ahn et al. ................ 438/158
6,599,786 B1 *   7/2003   Ahn et al. ................ 438/155
(Continued)

FOREIGN PATENT DOCUMENTS

JP   11-007046   1/1999
JP   2004-264463 A   9/2004
(Continued)

OTHER PUBLICATIONS

International Search Report for PCT/JP2009/062824, mailed Sep. 8, 2009.

*Primary Examiner* — Brian Healy
(74) *Attorney, Agent, or Firm* — Nixon & Vanderhye, P.C.

(57) ABSTRACT

Each pixel region includes first and second pixel electrodes (17a, 17b) and first and second capacitor electrodes (67x, 67y) positioned on a layer where a data signal line (15) exists. The first and second capacitor electrodes are aligned in a row direction in such a manner as to overlap a retention capacitor line (18) via a first insulating film and to overlap the second pixel electrode (17b) via a second insulating film. A drain electrode (9) of a transistor (12), the first pixel electrode (17a), a first connection line (38) connected with the first capacitor electrode (67x), and the second connection line connected with the second capacitor electrode (67y) are electrically connected with one another. A part of the first connection line (38) and a part of the second connection line (39) do not overlap the retention capacitor line (18). This allows increasing production yields of an active matrix substrate based on a capacitive coupling pixel division system and a liquid crystal panel including the active matrix substrate.

31 Claims, 37 Drawing Sheets

U.S. PATENT DOCUMENTS

| | | |
|---|---|---|
| 7,573,538 B2 * | 8/2009 | Nomura et al. ............... 349/39 |
| 2004/0160544 A1 | 8/2004 | Dai |
| 2005/0162893 A1 | 7/2005 | Yagi et al. |
| 2006/0023137 A1 | 2/2006 | Kamada et al. |
| 2008/0013007 A1 | 1/2008 | Yokoyama et al. |
| 2008/0083927 A1 | 4/2008 | Nishiura et al. |
| 2008/0088788 A1 | 4/2008 | Cho et al. |
| 2008/0129907 A1 * | 6/2008 | Jun et al. ............... 349/38 |
| 2008/0309841 A1 | 12/2008 | Yagi et al. |
| 2009/0073335 A1 | 3/2009 | Yagi et al. |
| 2011/0141376 A1 * | 6/2011 | Tsubata ............... 348/731 |

FOREIGN PATENT DOCUMENTS

| | | |
|---|---|---|
| JP | 2005-242307 | 9/2005 |
| JP | 2006-039290 | 2/2006 |
| JP | 2008-9058 A | 1/2008 |
| JP | 2008-097009 A | 4/2008 |
| JP | 2008-112136 A | 5/2008 |
| WO | 2006/054386 A1 | 5/2006 |

* cited by examiner

ACTIVE MATRIX SUBSTRATE, LIQUID CRYSTAL PANEL, LIQUID CRYSTAL DISPLAY UNIT, LIQUID CRYSTAL DISPLAY DEVICE, TELEVISION RECEIVER, AND ACTIVE MATRIX SUBSTRATE MANUFACTURING METHOD

This application is the U.S. national phase of International Application No. PCT/JP2009/062824 filed 15 Jul. 2009, which designated the U.S. and claims priority to JP Application No. 2008-218840 filed 27 Aug. 2008, and JP Application No. 2008301293 filed 26 Nov. 2008, the entire contents of each of which are hereby incorporated by reference.

TECHNICAL FIELD

The present invention relates to: an active matrix substrate in which a plurality of pixel electrodes are provided in one pixel region; and a liquid crystal display device (based on a pixel division system) including the active matrix substrate.

BACKGROUND ART

In order to improve a viewing angle dependency of a γ characteristic of a liquid crystal display device (e.g. to prevent excess brightness on a screen), there has been proposed a liquid crystal display device (based on a pixel division system. See Patent Literature 1 for example) in which a plurality of sub-pixels in one pixel are controlled to have different luminance so that area coverage modulation of the sub-pixels allows displaying a half tone.

In the active matrix substrate described in Patent Literature 1 (see FIG. 38), three pixel electrodes 121a-121c are provided in one pixel region in such a manner as to be along a source bus line 115, a source electrode 116s of a transistor 116 is connected with a contact electrode 117a, the contact electrode 117a and a control electrode 511 are connected with each other via an extraction line, the control electrode 511 and a contact electrode 117b are connected with each other via an extraction line, the contact electrode 117a and a pixel electrode 121a are connected with each other via a contact hole 120a, the contact electrode 117b and a pixel electrode 121c are connected with each other via a contact hole 120b, the pixel electrode 112b which is electrically floating overlaps the control electrode 511 via an insulating film, and the pixel electrode 121b is capacitance-coupled to each of the pixel electrodes 121a and 121c (capacitance-coupling pixel division system). Further, an auxiliary capacitor electrode 512 is provided so as to be adjacent to the control electrode 511 in a row direction (direction in which a gate bus line 112 extends). The auxiliary capacitor electrode 512 is connected with the pixel electrode 121b via a contact hole 513. At a portion where the control electrode 511 and the auxiliary capacitor bus line 113 overlap each other, a retention capacitor between the pixel electrodes 121a and 121c and the auxiliary capacitor bus line 113 is formed. At a portion where the control electrode 512 and the auxiliary capacitor bus line 113 overlap each other, a retention capacitor between the pixel electrode 121b and the auxiliary capacitor bus line 113 is formed.

In a liquid crystal display device including the active matrix substrate, each of sub-pixels corresponding to the pixel electrodes 121a and 121c can serve as a bright sub-pixel and a sub-pixel corresponding to the pixel electrode 121b can serve as a dark sub-pixel. Area coverage modulation of the two bright sub-pixels and the one dark sub-pixel allows displaying a half tone.

CITATION LIST

Patent Literature

[Patent Literature 1] Japanese Patent Application Publication, Tokukai, No. 2006-39290 (published on Feb. 9, 2006)

SUMMARY OF INVENTION

Technical Problem

However, in the aforementioned conventional active matrix substrate, the control electrode 511 and the auxiliary capacitor electrode 512 are aligned in a pixel region in a row direction, so that the control electrode 511 and the source bus line 115 are positioned closely to each other. This may cause a short-circuit between the control electrode 511 and the source bus line 115, resulting in a low process yield of active matrix substrates.

An object of the present invention is to provide an active matrix substrate based on a capacitance-coupling pixel division system, which can be produced with a higher process yield.

Solution to Problem

An active matrix substrate of the present invention includes a scanning signal line extending in a row direction, a data signal line extending in a column direction, a transistor connected with the scanning signal line and the data signal line, and a retention capacitor line, each pixel region including a first pixel electrode, a second pixel electrode, a first capacitor electrode, a second capacitor electrode, a first connection line, and a second connection line, each of the first capacitor electrode and the second capacitor electrode being positioned on a layer where the data signal line is positioned, the first connection line being connected with the first capacitor electrode, and the second connection line being connected with the second capacitor electrode, the first capacitor electrode and the second capacitor electrode being aligned in the row direction in such a manner as to overlap the retention capacitor line via a first insulating film and to overlap the second pixel electrode via a second insulating film, one conductive electrode of the transistor, the first pixel electrode, the first connection line, and the second connection line being electrically connected with one another, and at least a part of the first connection line and at least a part of the second connection line not overlapping the retention capacitor line.

The active matrix substrate of the present invention includes two capacitor electrodes (first and second capacitor electrodes) having the same function. Accordingly, a coupling capacitance is formed between the first and capacitor electrode and the second pixel electrode and between the second capacitor electrode and the second pixel electrode, and a retention capacitor is formed between the first capacitor electrode and the retention capacitor line and between the second capacitor electrode and the retention capacitor line.

One conductive electrode of the transistor, the first pixel electrode, the first connection line connected with the first capacitor electrode, and the second connection line connected with the second, capacitor electrode being electrically connected with one another. Accordingly, if a short-circuit between the first capacitor electrode and a data signal line occurs, cutting the first connection line at a portion which does not overlap the retention capacitor line allows maintaining a capacitive coupling between the first and second pixel electrodes. If a short-circuit between the second capacitor electrode and a data signal line occurs, cutting the second connection line at a portion which does not overlap the retention capacitor line allows maintaining a capacitive coupling between the first and second pixel electrodes.

As described above, the active matrix substrate of the present invention is designed to allow a short-circuit between a data signal line and the first capacitor electrode or the second capacitor electrode to be repaired without greatly reducing the coupling capacitance and the retention capacitance (i.e. allow increasing a production yield of the active matrix substrate).

The active matrix substrate of the present invention may be arranged such that in said each pixel region, a third capacitor electrode electrically connected with the second pixel electrode is positioned in such a manner as to overlap the retention capacitor line, and the first capacitor electrode, the second capacitor electrode, and the third capacitor electrode are aligned in this order along the row direction.

The active matrix substrate of the present invention may be arranged so as to further include an extracted line extracted from said one conductive electrode of the transistor, and the extracted line being connected with the first pixel electrode via a contact hole, the extracted line being connected with the first connection line and the second connection line on a layer where the extracted line, the first connection line, and the second connection line are positioned, and the third capacitor electrode being connected with the second pixel electrode via a contact hole.

The active matrix substrate of the present invention may be arranged such that at least one of the first connection line and the second connection line overlaps a gap between the first pixel electrode and the second pixel electrode.

The active matrix substrate of the present invention may be arranged such that the second insulating film is an interlayer insulating film which covers a channel of the transistor.

The active matrix substrate of the present invention may be arranged such that the interlayer insulating film is designed such that at least a part of a portion overlapping the first capacitor electrode and the second pixel electrode and at least a part of a portion overlapping the second capacitor electrode and the second pixel electrode are thin.

The active matrix substrate of the present invention may be arranged such that the interlayer insulating film includes an inorganic interlayer insulating film and an organic interlayer insulating film, and said at least a part of a portion overlapping the first capacitor electrode and the second pixel electrode and said at least a part of a portion overlapping the second capacitor electrode and the second pixel electrode are designed such that the organic interlayer insulating film is thinned or the organic interlayer insulating film is removed.

The active matrix substrate of the present invention may be arranged such that the first insulating film is a gate insulating film.

The active matrix substrate of the present invention may be arranged such that the gate insulating film is designed such that at least a part of a portion overlapping the retention capacitor line and the first capacitor electrode, at least a part of a portion overlapping the retention capacitor line and the second capacitor electrode, and at least a part of a portion overlapping the retention capacitor line and the third capacitor electrode are thin.

The active matrix substrate of the present invention may be arranged such that the gate insulating film includes an organic gate insulating film and an inorganic gate insulating film, and said at least a part of a portion overlapping the retention capacitor line and the first capacitor electrode, said at least a part of a portion overlapping the retention capacitor line and the second capacitor electrode, and said at least a part of a portion overlapping the retention capacitor line and the third capacitor electrode are designed such that the organic gate insulating film is thin or the organic gate insulating film is removed.

The active matrix substrate of the present invention may be arranged such that the first pixel electrode and the scanning signal line partially overlap each other.

The active matrix substrate of the present invention may be arranged so as to further include a retention capacitor extension, on a plane view, the retention capacitor extension extending from the retention capacitor line along the data signal line in such a manner as to overlap an edge of the second pixel electrode or run outside the edge.

The active matrix substrate of the present invention may be arranged such that a gap between the first pixel electrode and the second pixel electrode serves as a structure for controlling alignment.

The active matrix substrate of the present invention may be arranged such that said each pixel region includes a third pixel electrode, and the third pixel electrode is electrically connected with the first pixel electrode.

The active matrix substrate of the present invention may be arranged such that the first pixel electrode, the second pixel electrode, and the third pixel electrode are aligned in this order along the column direction.

The active matrix substrate of the present invention may be arranged such that in said each pixel region, a third capacitor electrode electrically connected with the second pixel electrode is positioned in such a manner as to overlap the retention capacitor line, and the first capacitor electrode, the second capacitor electrode, and the third capacitor electrode are aligned in this order along the row direction.

The active matrix substrate of the present invention may be arranged such that said each pixel region includes a third connection line connected with the first capacitor electrode and a fourth connection line connected with the second capacitor electrode, and the first connection line and the second connection line are connected with each other, and the third connection line and the fourth connection line are connected with each other.

The active matrix substrate of the present invention may be arranged such that said each pixel region includes a third pixel electrode, and the first pixel electrode, the second pixel electrode, and the third pixel electrode are aligned in this order along the column direction, the third connection line and the fourth connection line are electrically connected with the third pixel electrode, and the first connection line and the second connection line each partially overlap a gap between the first pixel electrode and the second pixel electrode, and the third connection line and the fourth connection line each partially overlap a gap between the second pixel electrode and the third pixel electrode.

The active matrix substrate of the present invention may be arranged such that said each pixel region includes a third pixel electrode, and the first pixel electrode, the second pixel electrode, and the third pixel electrode are aligned in this order along the column direction, the third connection line and the fourth connection line are electrically connected with the third pixel electrode, and the first connection line and the third connection line each partially overlap one of two edges of the second pixel electrode which edges are along the data signal line, and the second connection line and the fourth connection line each partially overlap the other of the two edges.

A liquid crystal panel of the present invention may include the active matrix substrate and a counter substrate facing the active matrix substrate, the counter substrate having a convexity on its surface, the convexity facing a region of the active matrix substrate where the interlayer insulating film is thin.

A liquid crystal panel of the present invention may include the active matrix substrate and a counter substrate facing the active matrix substrate, the counter substrate having a convexity on its surface, the convexity facing a region of the active matrix substrate where the gate insulating film is thin.

The liquid crystal panel of the present invention may be arranged such that the retention capacitor line extends in the row direction, and when the convexity of the surface of the counter substrate is projected onto a layer where the retention capacitor line is provided, the projected convexity is positioned between two edges of the retention capacitor line in the row direction.

The liquid crystal panel of the present invention may be arranged such that the counter substrate has ribs for controlling alignment, and the counter substrate is provided with a protruding member at a portion facing the region of the active matrix substrate where the interlayer insulating film is thin, the protruding member being made of a same material as the ribs.

The liquid crystal panel of the present invention may be arranged such that the counter substrate is a color filter substrate, and the counter substrate is provided with a protruding member at a portion facing the region of the active matrix substrate where the interlayer insulating film is thin, the protruding member being made of a same material as a colored layer.

A liquid crystal panel of the present invention includes the active matrix substrate. A liquid crystal display unit of the present invention includes the liquid crystal panel and a driver. A liquid crystal display device of the present invention includes the liquid crystal display unit and a light source device. A television receiver of the present invention includes the liquid crystal display device and a tuner section for receiving television broadcasting.

A method of the present invention for producing an active matrix substrate is a method for producing an active matrix substrate including a scanning signal line extending in a row direction, a data signal line extending in a column direction, a transistor connected with the scanning signal line and the data signal line, and a retention capacitor line, the method comprising the steps of: (i) forming, in each pixel region, a first pixel electrode, a second pixel electrode, a first capacitor electrode, and a second capacitor electrode in such a manner that (a) the first capacitor electrode and the second capacitor electrode are positioned on a layer where the data signal line is positioned, (b) the first capacitor electrode and the second capacitor electrode are aligned in the row direction to overlap the retention capacitor line via a first insulating film and to overlap the second pixel electrode via a second insulating film, (c) one conductive electrode of the transistor, the first pixel electrode, a first connection line connected with the first capacitor electrode, and a second connection line connected with the second capacitor electrode are electrically connected with one another, and (d) at least a part of the first connection line and at least a part of the second connection line do not overlap the retention capacitor line; and (ii) cutting the first connection line if a short-circuit between the first capacitor electrode and the data signal line occurs, and cutting the second connection line if a short-circuit between the second capacitor electrode and the data signal line occurs.

The method of the present invention may be arranged such that in the step (i), a third capacitor electrode is formed in such a manner that the third capacitor electrode is connected with the second pixel electrode via a contact hole, the third capacitor electrode overlaps the retention capacitor line, and the first capacitor electrode, the second capacitor electrode, and the third capacitor electrode are aligned in this order in the row direction, and if a short-circuit between the third capacitor electrode and the data signal line occurs, a portion of the second pixel electrode which portion is in the contact hole is removed.

An active matrix substrate of the present invention includes a scanning signal line, a transistor connected with the scanning signal line, and a retention capacitor line, each pixel region including a first pixel electrode, a second pixel electrode, a first capacitor electrode, a second capacitor electrode, and a connection line connecting the first capacitor electrode and the second capacitor electrode, the first capacitor electrode and the second capacitor electrode each overlapping the retention capacitor line via a first insulating film and overlapping the second pixel electrode via a second insulating film, one conductive electrode of the transistor being electrically connected with the connection line, and said one conductive electrode or the other conductive electrode of the transistor being electrically connected with the first pixel electrode, and at least a part of the connection line not overlapping the retention capacitor line.

Advantageous Effects of Invention

As described above, the active matrix substrate is designed to allow a short-circuit between a data signal line and capacitance electrodes to be repaired, thereby increasing a production yield of the active matrix substrate.

Figure 32:
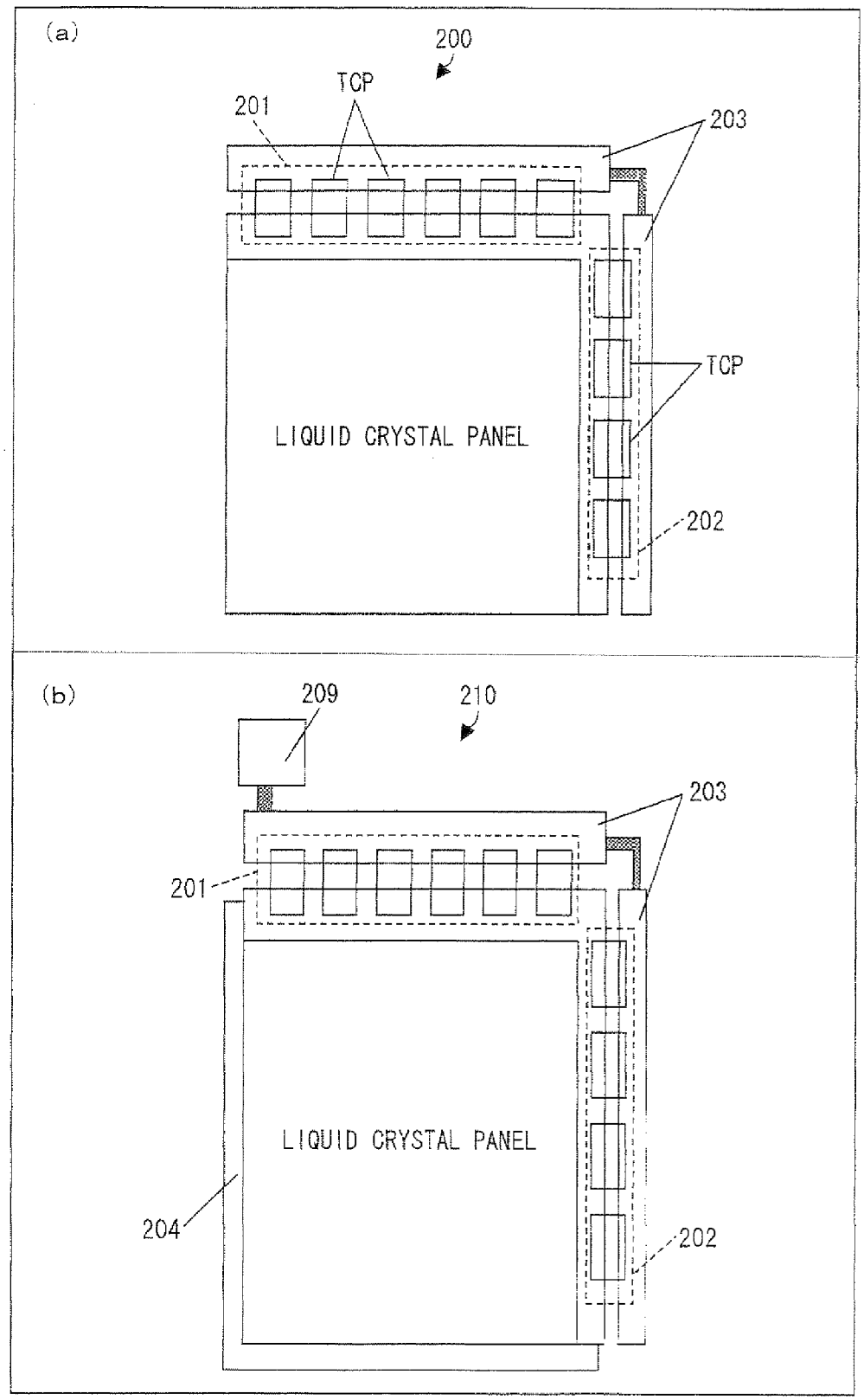

(a) of FIG. 32 schematically shows a configuration of a liquid crystal display unit of the present invention. (b) of FIG. 32 schematically shows a configuration of a liquid crystal display device of the present invention.

Figure 33:
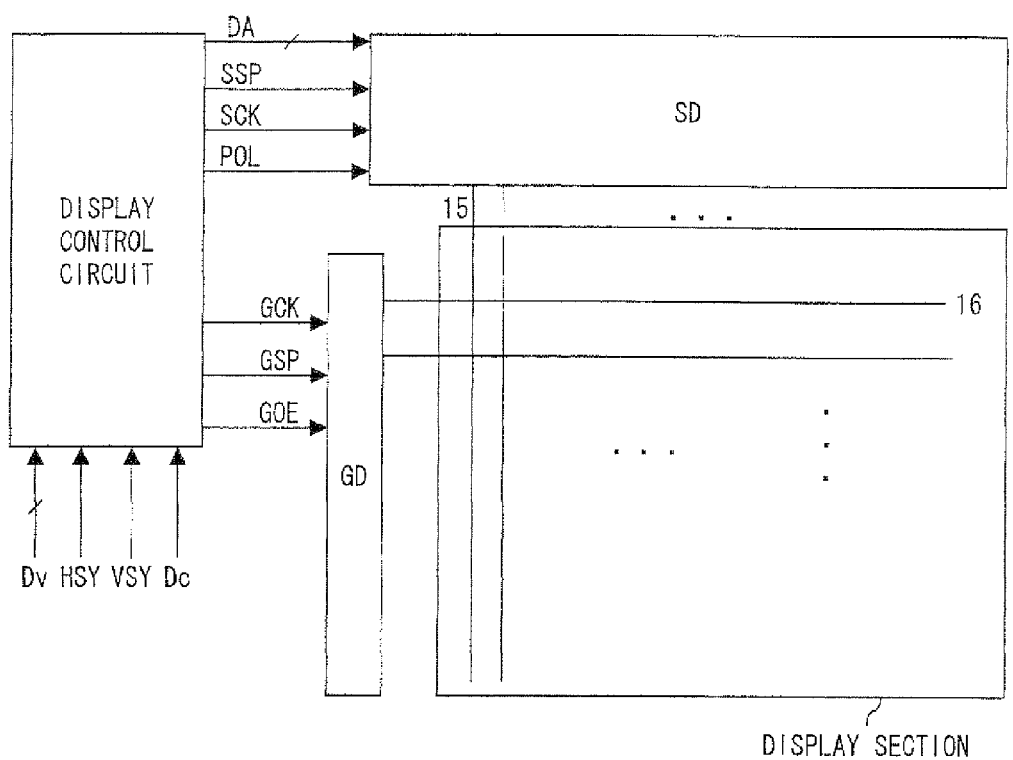

FIG. 33 is a block diagram showing a whole configuration of the liquid crystal display device of the present invention.

Figure 34:
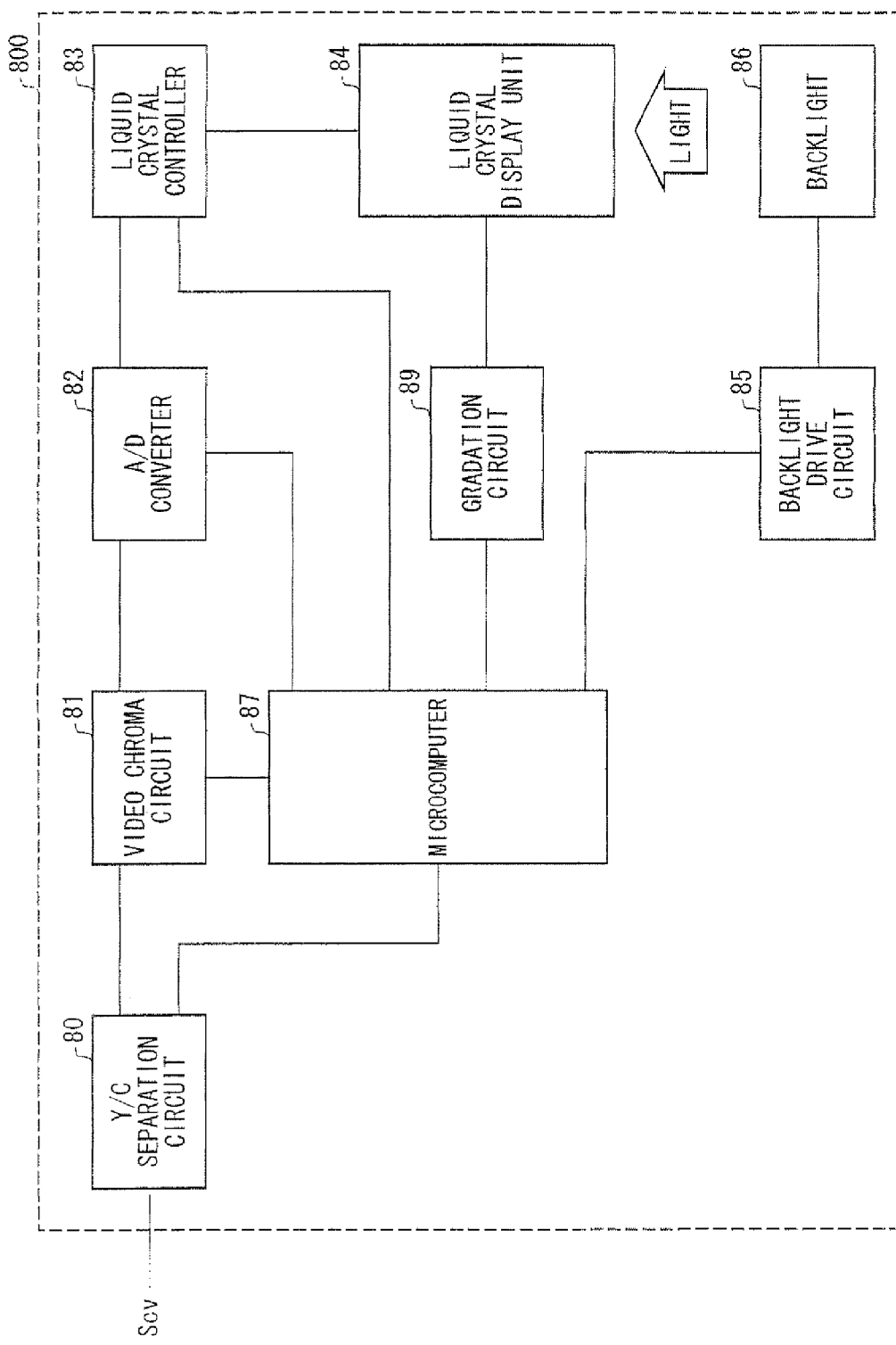

FIG. 34 is a block diagram explaining functions of the liquid crystal display device of the present invention.

Figure 35:
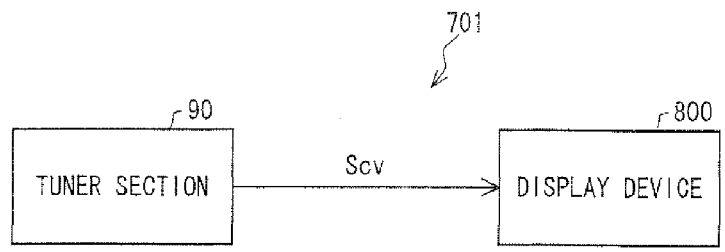

FIG. 35 is a block diagram explaining functions of a television receiver of the present invention.

Figure 36:
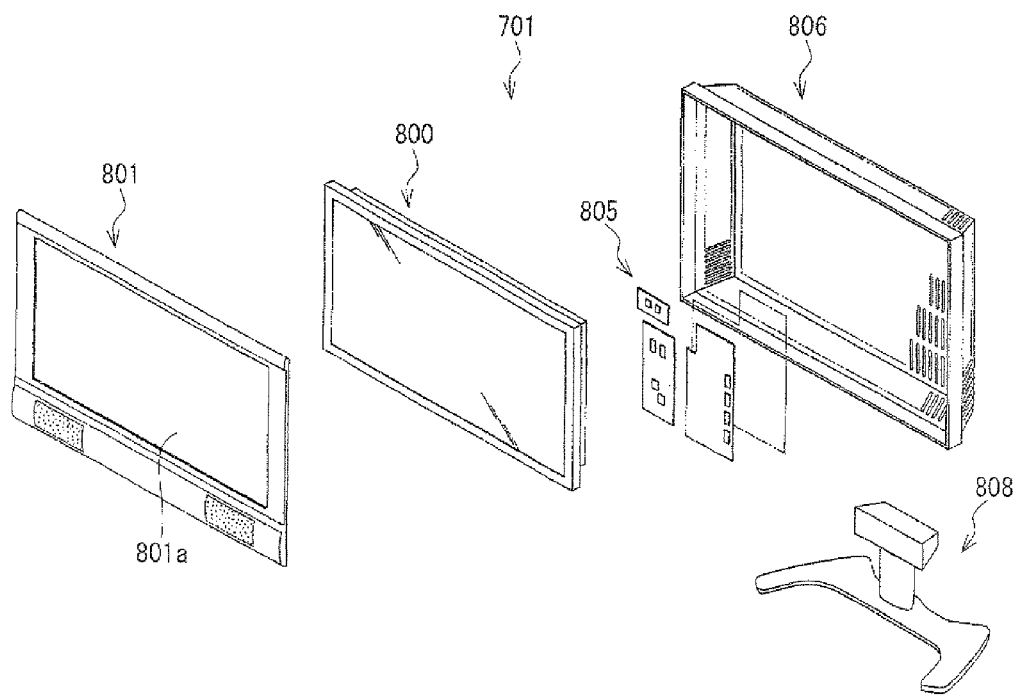

FIG. 36 is an exploded perspective drawing showing a configuration of the television receiver of the present invention.

Figure 37:
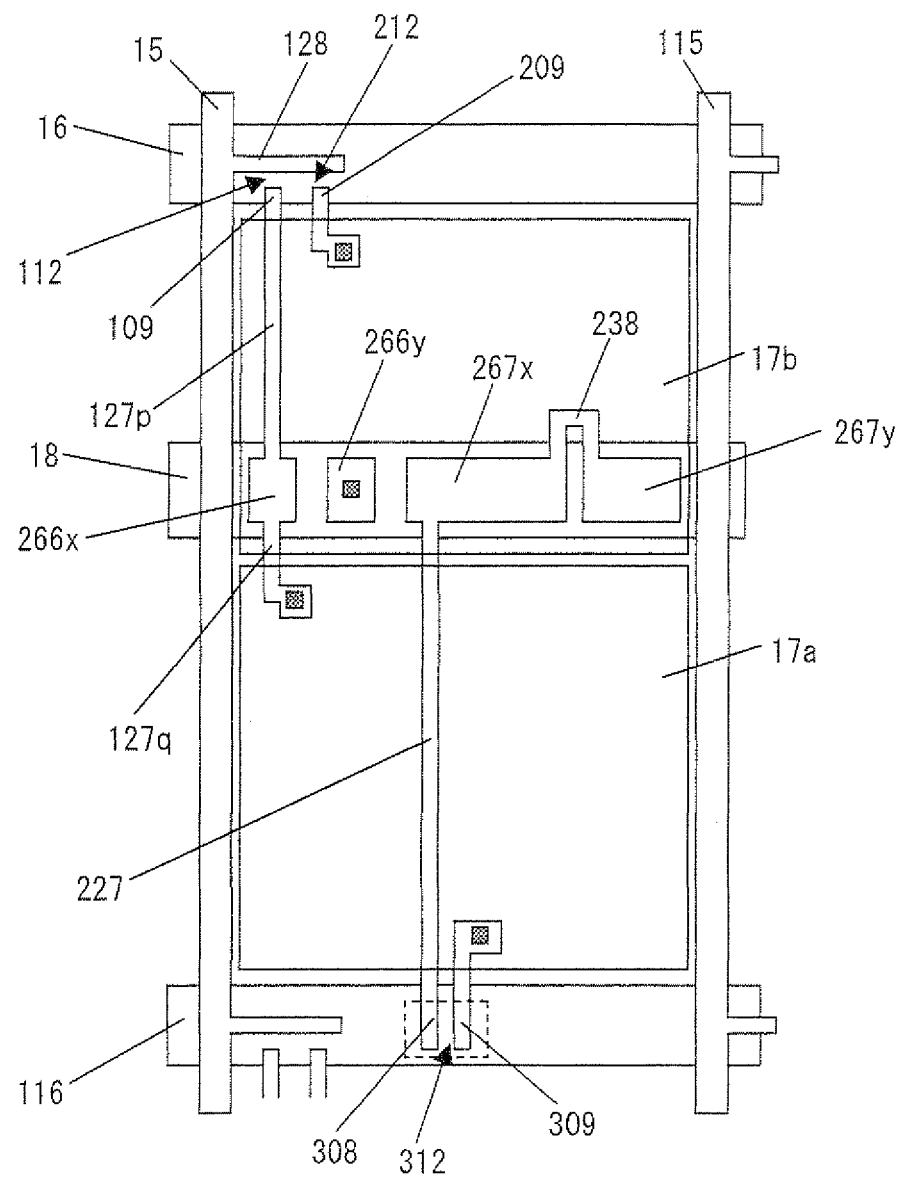

FIG. 37 is a plane drawing showing still another configuration of the liquid crystal panel of the present invention.

Figure 38:
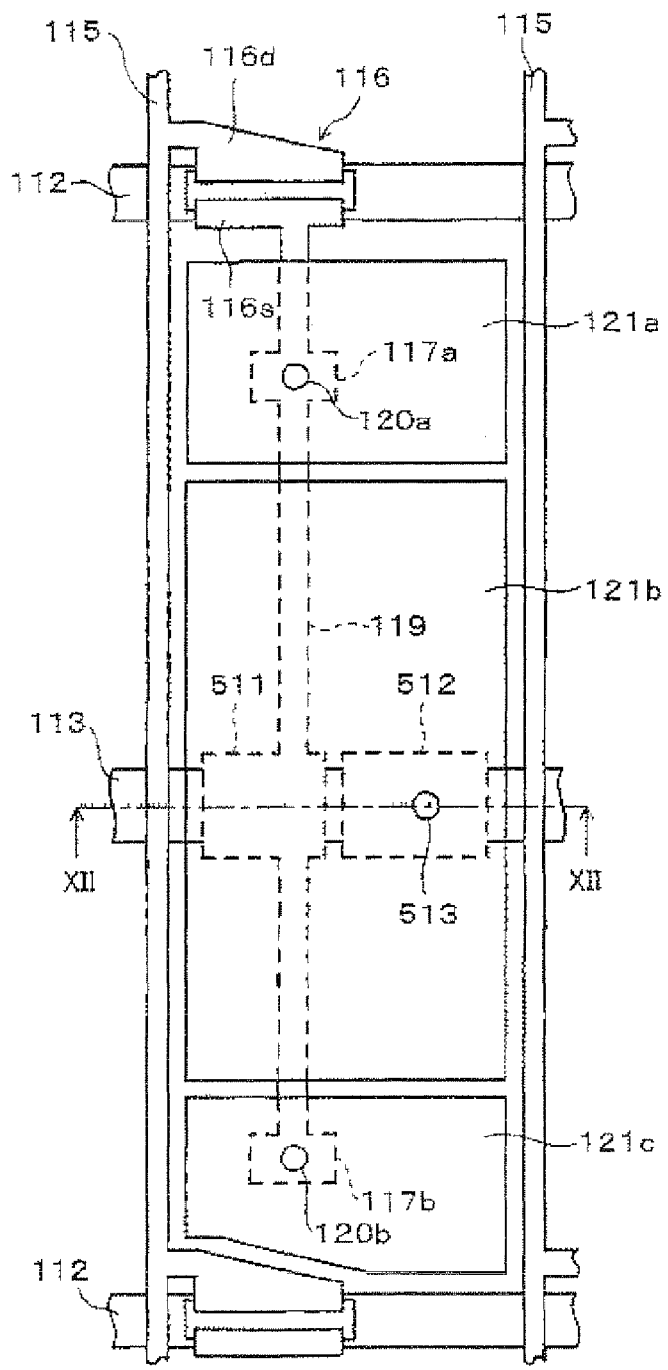

FIG. 38 is a plane drawing showing a configuration of a conventional liquid crystal panel.

DESCRIPTION OF EMBODIMENTS

An example of an embodiment of the present invention is explained below with reference to FIGS. 1-37. For convenience of explanation, a direction in which scanning signal lines extend is regarded as a row direction. Needless to say, when a liquid crystal display device including a liquid crystal display panel of the present invention (or an active matrix substrate used in the liquid crystal display panel) is used (viewed), scanning signal lines may extend either in a lateral direction or a longitudinal direction. In the drawings showing a liquid crystal display panel, an alignment-controlling structure is not shown if necessary.

Figure 3:
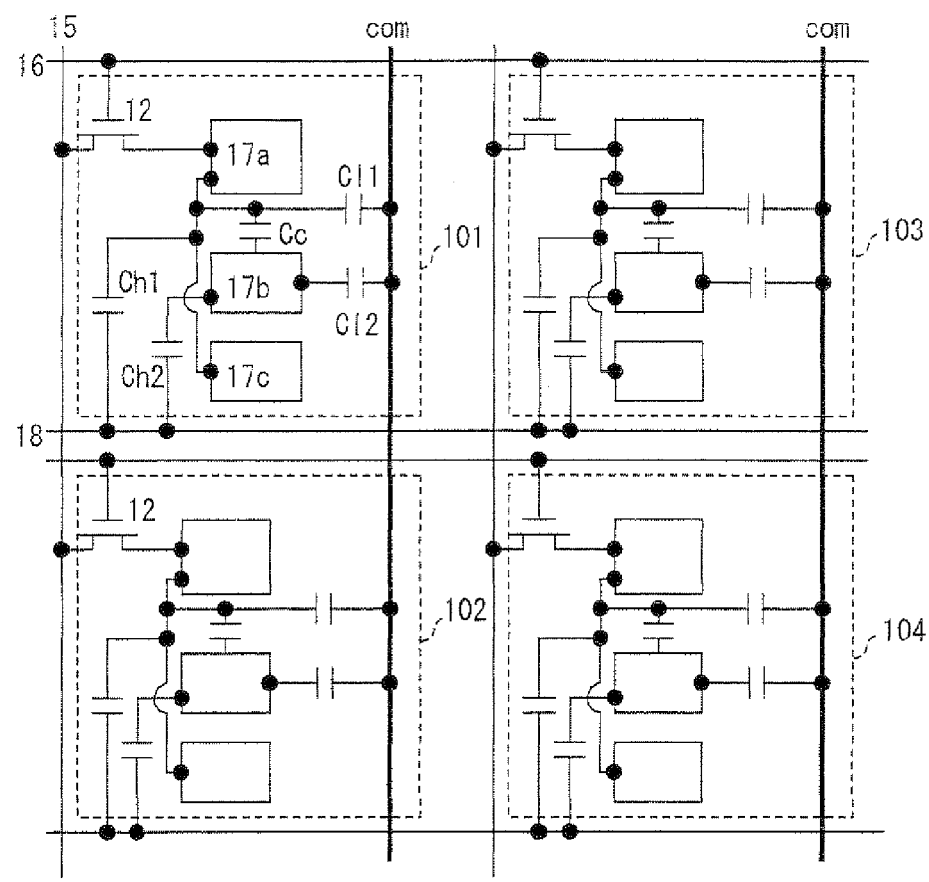
FIG. 3 is an equivalent circuit diagram of the liquid crystal panel shown in FIG. 1.

FIG. 3 is an equivalent circuit diagram showing a part of a liquid crystal display panel in accordance with the present embodiment. As shown in FIG. 3, the liquid crystal display panel includes a data signal line 15 extending in a column direction (up-down direction in the drawing), a scanning signal line 16 extending in a row direction (right-left direction in the drawing), pixels (101-104) positioned in row and column directions, a retention capacitor line 18, and a common electrode (counter electrode) corn. Each pixel has the same structure. A pixel column including the pixels 101 and 102 is adjacent to a pixel column including the pixels 103 and 104. A pixel row including the pixels 101 and 103 is adjacent to a pixel row including the pixels 102 and 104.

In the liquid crystal display panel, one data signal line 15, one scanning signal line 16, and one retention capacitor line 18 are provided with respect to each pixel. Three pixel electrodes (17a-17c) are provided with respect to one pixel, and the three pixel electrodes are aligned in a column direction.

For example, in the pixel 101, the pixel electrode 17a is connected with the data signal line 15 via a transistor 12 connected with the scanning signal line 16, the pixel electrodes 17a and 17c are electrically connected with each other, the pixel electrodes 17a and 17c are connected with the pixel electrode 17b via a coupling capacitance Cc, a retention capacitor Ch1 is formed between the pixel electrodes 17a and 17c and the retention capacitor line 18, a retention capacitor Ch2 is formed between the pixel electrode 17b and the retention capacitor line 18, a liquid crystal capacitor C11 is formed between the pixel electrodes 17a and 17c and the common electrode coin, and a liquid crystal capacitor C12 is formed between the pixel electrode 17b and the common electrode corn.

In the liquid crystal display device including the liquid crystal display panel, when the scanning signal line 16 is selected, the pixel electrode 17a gets connected with the data signal line 15 (via the transistor 12). Assume that potentials of the pixel electrodes 17a and 17c after the transistor 12 is made off are Vac and a potential of the pixel electrode 17b after the transistor 12 is made off is Vb. Since the pixel electrodes 17a and 17c are connected with the pixel electrode 17b via the coupling capacitance Cc, a relation |Vac|≧|Vb| is met (|Vb|, for example, indicates a difference in potential between Vb and Vcom (potential of com)). Consequently, a sub-pixel including the pixel electrode 17a serves as a bright sub-pixel, a sub-pixel including the pixel electrode 17b serves as a dark sub-pixel, and a sub-pixel including the pixel electrode 17c serves as a bright sub-pixel so that area coverage modulation of the two bright sub-pixels and the one dark sub-pixel allows displaying a half tone. This allows improving a viewing angle characteristic of the liquid crystal display device in accordance with the present embodiment.

Figure 1:
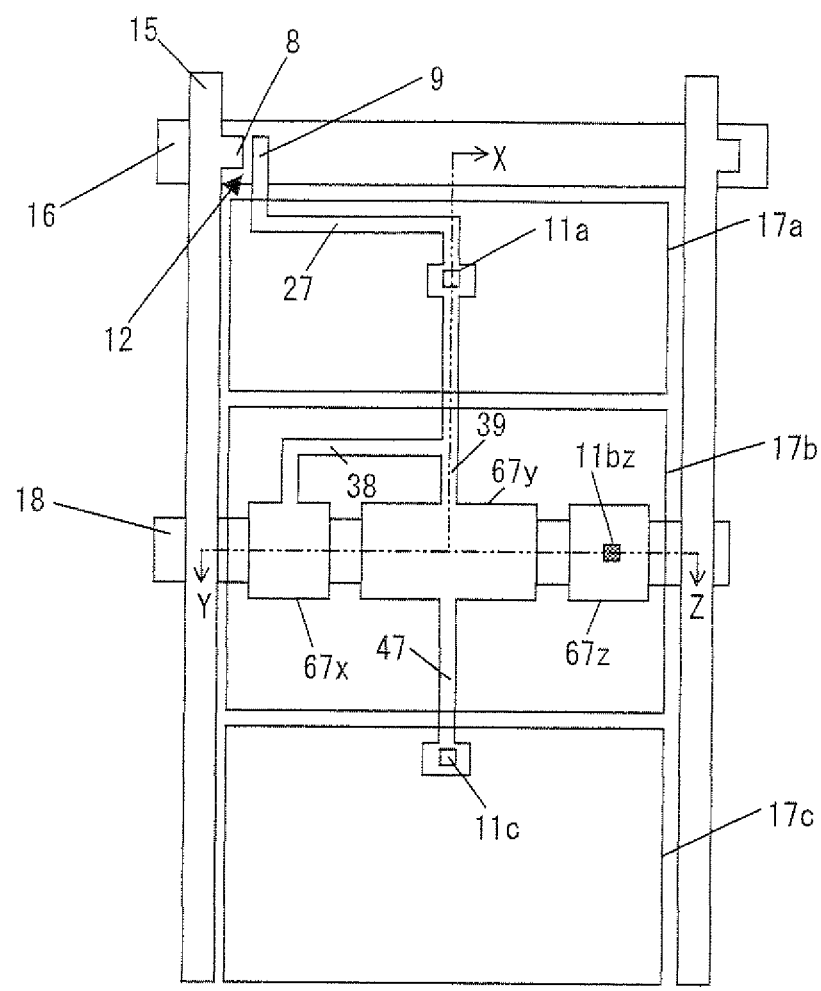
FIG. 1 is a plane drawing showing a configuration of a liquid crystal panel of the present invention.

FIG. 1 shows a specific example of the pixel 101 shown in FIG. 3. In FIG. 1, for easier viewing, only members of an active matrix substrate are shown and members of a color filter substrate (counter substrate) are not shown. As shown in the drawing, the transistor 12 is provided near a portion where the data signal line 15 and the scanning signal line 16 cross each other, and three pixel electrodes (first-third pixel electrodes 17a-17c) and three capacitor electrodes (first-third capacitor electrodes 67x-67z) existing on the same layer as the data signal line exists are provided in a pixel region defined by the signal lines (15 and 16). The first-third pixel electrodes 17a-17c each has a rectangular shape, and aligned in this order in a column direction. The retention capacitor line 18 extends in a row direction in such a manner as to cross the center of a pixel (in such a manner as to overlap the second pixel electrode 17b).

The first-third capacitor electrodes 67x-67z are aligned in this order in a row direction in such a manner as to overlap the retention capacitor line 18 via a gate insulating film (not shown), and each of the first-third capacitor electrodes 67x-67z overlaps the second pixel electrode 17b via an interlayer insulating film (not shown). That is, the second capacitor electrode 67y is positioned below a center portion of the second pixel electrode 17b, the first capacitor electrode 67x is positioned between one of two adjacent data signal lines (data signal line 15) and the second capacitor electrode 67y, and the first capacitor electrode 67z is positioned between the other of the two adjacent data signal lines and the second capacitor electrode 67y. That is, a distance between the first capacitor electrode 67x and the data signal line 15 closest to the first capacitor electrode 67x is smaller than a distance between the second capacitor electrode 67y and the data signal line 15 closest to the second capacitor electrode 67y. Further, a source electrode 8 of the transistor 12 is connected with the data signal line, a drain electrode 9 is connected with the second capacitor electrode 67y via a drain extracting line 27, and the drain extracting line 27 is connected with the pixel electrode 17a via a contact hole 11a. Further, the drain extracting line 27 is connected with a first connection line 38 on a plane where both the drain extracting line 27 and the first connection line 38 exist, and is also connected with a second connection line 39 on the plane. The first connection line 38 is connected with the first capacitor electrode 67x, and the second connection line 39 is connected with the first capacitor electrode 67y. The first and second connection lines 38 and 39 are positioned in such a manner as not to overlap the retention capacitor line 18. The second capacitor electrode 67y is connected with an intermediate line 47, and the intermediate line 47 is connected with the pixel electrode 17c via a contact hole 11c. This configuration allows the drain electrode 9 of the transistor 12, the first pixel electrode 17a, the first connection line 38, and the second connection line 39 to be electrically connected with one another, so that a coupling capacitance Cc (see FIG. 3) is formed at a portion where the first capacitor electrode 67x and the second pixel electrode 17b overlap each other and at a portion where the second capacitor electrode 67y and the second pixel electrode 17b overlap each other. Further, the retention capacitor Ch1 (see FIG. 3) is formed at a portion where the first and second capacitor electrodes 67x and 67y and the retention capacitor line 18 overlap each other.

Further, the third capacitor electrode 67z and the second pixel electrode 17b are connected with each other via a contact hole 11bz. Consequently, much of the retention capacitor Ch2 is formed at a portion where the third capacitor electrode 67z and the retention capacitor line 18 overlap each other.

Figure 2:
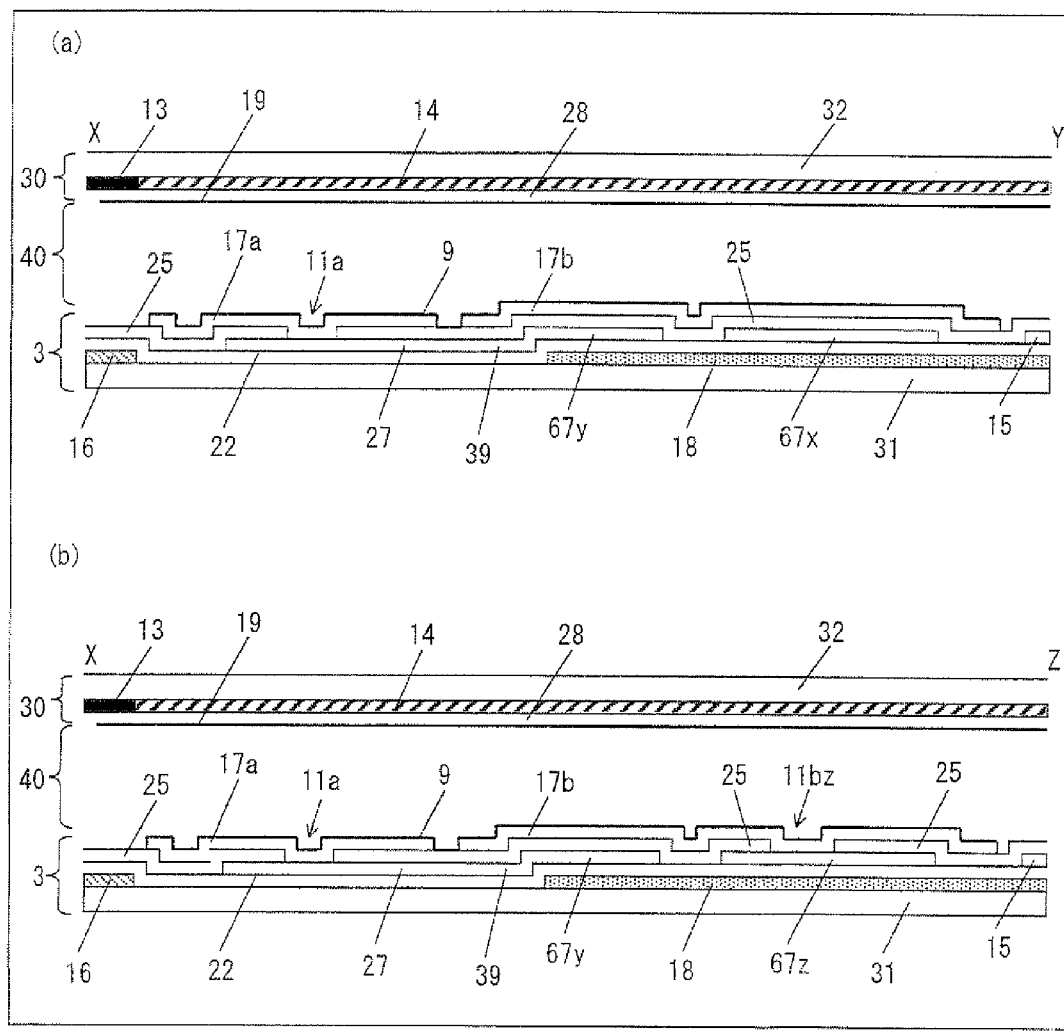
FIG. 2 is a cross sectional drawing of the liquid crystal panel taken along the lines X-Y and X-Z of FIG. 1.

(a) of FIG. 2 is a cross sectional drawing taken along a line X-Y of FIG. 1. (b) of FIG. 2 is a cross sectional drawing taken along a line X-Z of FIG. 1. As shown in (a) and (b) of FIG. 2, the liquid crystal panel in accordance with the present embodiment includes an active matrix substrate 3, a color filter substrate 30 facing the active matrix substrate 3, and a liquid crystal layer 40 provided between the two substrates (3 and 30). In the active matrix substrate 3, the scanning signal line 16 and the retention capacitor line 18 are provided on the glass substrate 31, and an inorganic gate insulating film 22 (e.g. SiNx) is provided so as to cover the scanning signal line 16 and the retention capacitor line 18. On the inorganic gate insulating film 22, there is provided a metal layer including the drain extracting line 27, the second connection line 39, the first-third capacitor electrodes 67x-67z, and the data signal line 15. Although not shown in the cross section of the metal layer on the inorganic gate insulating film 22, the metal layer includes a semiconductor layer (i layer and n+ layer), a source electrode and a drain electrode each adjacent to the n+ layer, the intermediate line 47, and the first connection line 38. Further, an inorganic interlayer insulating film 25 (e.g. SiNx) is provided in such a manner as to cover the metal layer. On the inorganic interlayer insulating film 25, there are provided the first and second pixel electrodes 17a and 17b, and an alignment film 9 is provided in such a manner as to cover these pixel electrodes. The inorganic interlayer insulating film 25 is penetrated at a contact hole 11a, which connects the first pixel electrode 17a with the drain extracting line 27. Further, the inorganic interlayer insulating film 25 is penetrated at a contact hole 11bz, which connects the second pixel electrode 17b with the third capacitor electrode 67z.

Each of the first capacitor electrode 67x and the second capacitor electrode 67y overlaps the second pixel electrode 17b via the inorganic interlayer insulating film 25, so that the coupling capacitance Cc (see FIG. 3) is formed there. Further, each of the first capacitor electrode 67x and the second capacitor electrode 67y overlaps the retention capacitor line 18 via the inorganic gate insulating film 22, so that the retention capacitor Ch1 (see FIG. 3) is formed there. Further, the third capacitor electrode 67z overlaps the retention capacitor line 18 via the inorganic gate insulating film 22, so that much of the retention capacitor Ch2 (see FIG. 3) is formed there.

On the other hand, in the color filter substrate 30, a colored layer (color filter layer) 14 is provided on a glass substrate 32, a common electrode (com) 28 is provided on the colored layer 14, and an alignment film 19 is provided in such a manner as to cover the common electrode 28.

Figure 4:
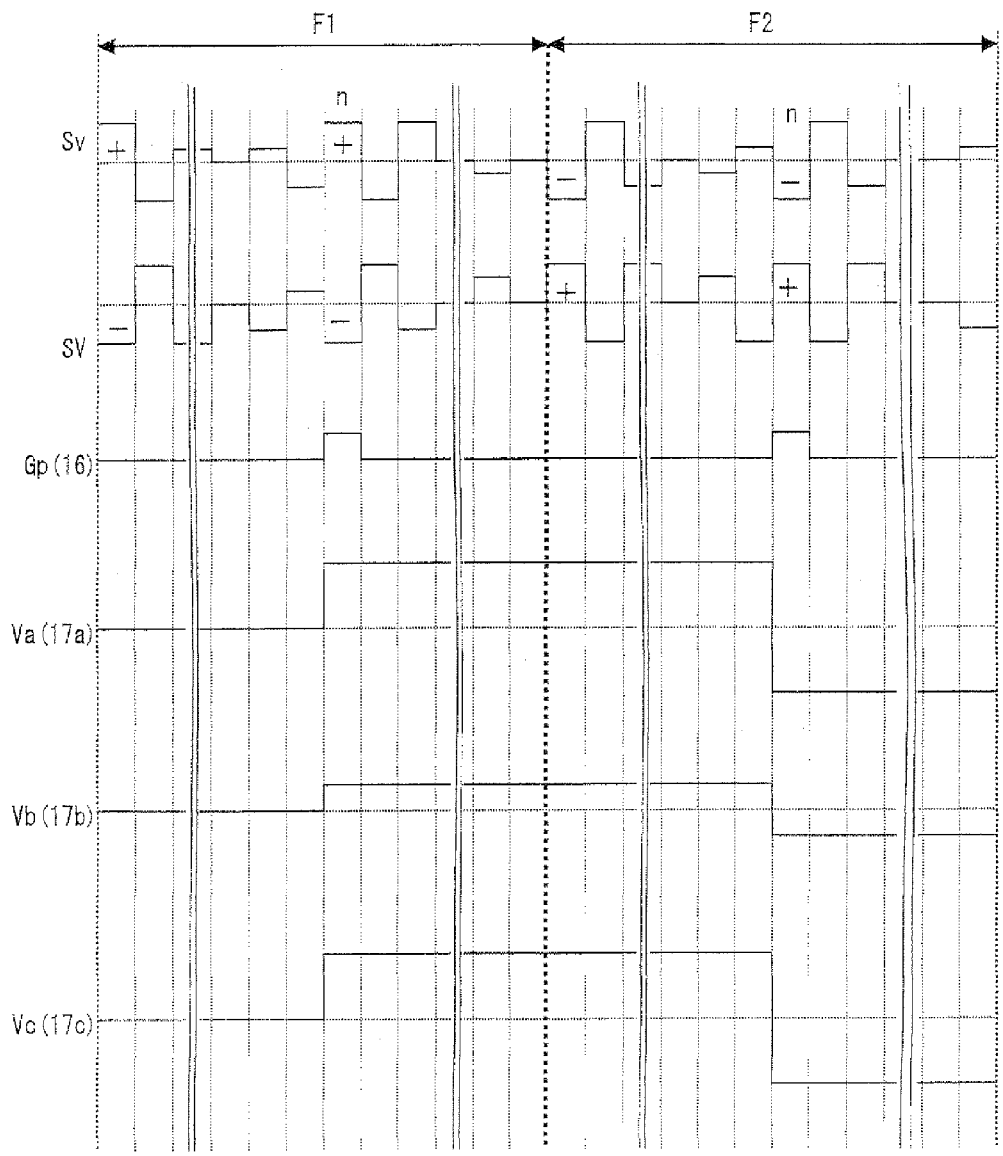
FIG. 4 is a timing chart showing how to drive a liquid crystal display device including the liquid crystal panel shown in FIG. 1.
Figure 5:
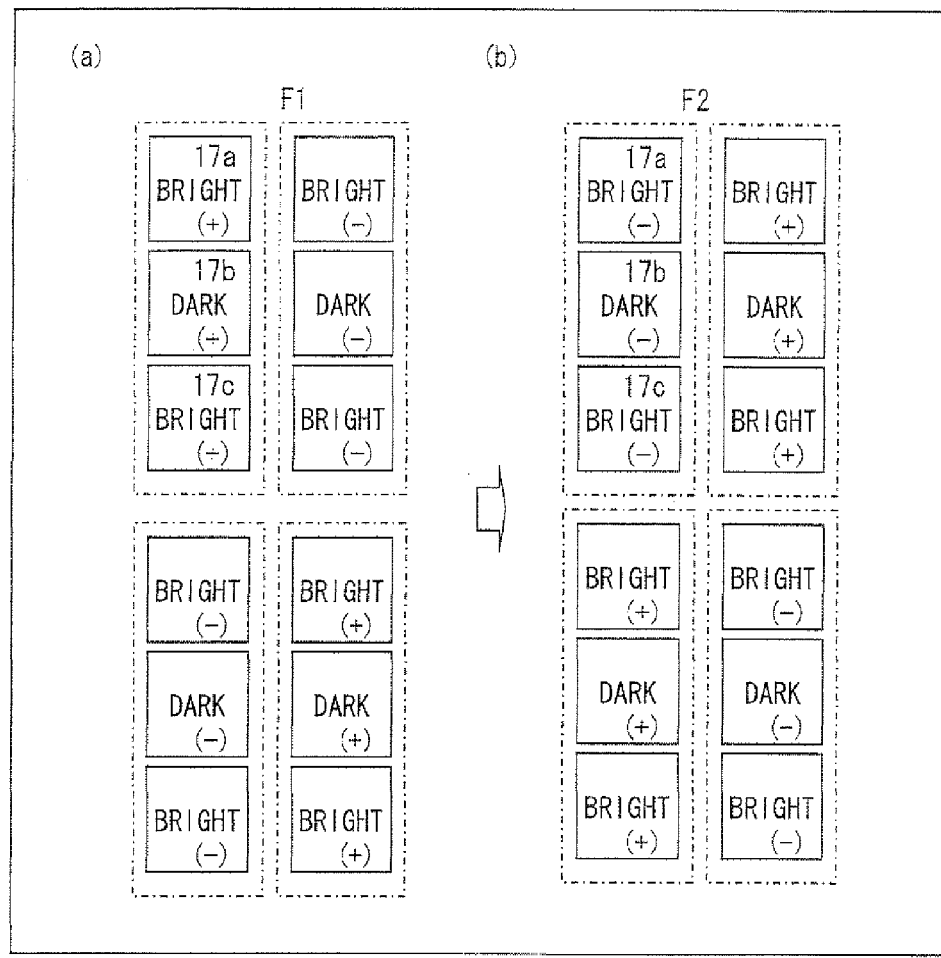
FIG. 5 is a drawing schematically showing a display state of each frame when the liquid crystal display device is driven as shown in FIG. 4.

FIG. 4 is a timing chart showing a driving method of the liquid crystal display device (normally black mode liquid crystal display device) in accordance with the present embodiment, including the liquid crystal panel shown in FIGS. 1 and 2. Sv and SV indicate signal potentials supplied to two adjacent data signal lines, respectively. Gp indicates a gate-on pulse signal supplied to the scanning signal line 16. Va-Vc indicate potentials of the pixel electrodes 17a-17c, respectively.

In this driving method, as shown in FIG. 4, scanning signal lines are sequentially selected, the polarity of a signal potential supplied to a data signal line is inverted with respect to every one horizontal scanning period (1H), the polarity of a signal potential supplied to a specific horizontal scanning period in individual frames is inverted with respect to every one frame, and signal potentials with different polarities are supplied to two adjacent data signal lines in one horizontal scanning period.

Specifically, consecutive frames F1 and F2 are designed as follows: in F1, scanning signal lines are sequentially selected. To one of two adjacent data signal lines is supplied a signal potential with a plus polarity in nth horizontal scanning period (including a writing period for the pixel electrode 17a for example) and a signal potential with a minus polarity in (n+1)th horizontal scanning period. To the other of the two adjacent data signal lines is supplied a signal potential with a minus polarity in nth horizontal scanning period and a signal potential with a plus polarity in (n+1)th horizontal scanning period. Consequently, a relation $|Va|=|Vc|\geq|Vb|$ is met as shown in FIG. 4, so that the sub-pixel including the pixel electrode 17a (plus polarity) serves as a bright sub-pixel (hereinafter "bright"), the sub-pixel including the pixel electrode 17b (plus polarity) serves as a dark sub-pixel (hereinafter "dark"), and the sub-pixel including the pixel electrode 17c (plus polarity) serves as "bright". As a result, the pixels serve as "bright" and "dark" as shown in (a) of FIG. 5.

Further, in F2, scanning signal lines are sequentially selected. To one of two adjacent data signal lines is supplied a signal potential with a minus polarity in nth horizontal scanning period (including a writing period for the pixel electrode 17a for example) and, a signal potential with a plus polarity in (n+1)th horizontal scanning period. To the other of the two adjacent data signal lines is supplied a signal potential with a plus polarity in nth horizontal scanning period and a signal potential with a minus polarity in (n+1)th horizontal scanning period. Consequently, a relation $|Va|=|Vc|\geq|Vb|$ is met as shown in FIG. 4, so that the sub-pixel including the pixel electrode 17a (minus polarity) serves as a bright sub-pixel (hereinafter "bright"), the sub-pixel including the pixel electrode 17b (minus polarity) serves as a dark sub-pixel (hereinafter "dark"), and the sub-pixel including the pixel electrode 17c (minus polarity) serves as "bright". As a result, the pixels serve as "bright" and "dark" as shown in (b) of FIG. 5.

Although alignment controlling structures are not shown in FIGS. 1 and 2, an MVA (Multidomain Vertical Alignment) liquid crystal panel is designed such that each pixel electrode has a slit for controlling alignment and a color filter substrate is provided with ribs for controlling alignment. Instead of the ribs for controlling alignment as above, a common electrode of a color filter substrate may be provided with slits for controlling alignment.

Figure 6:
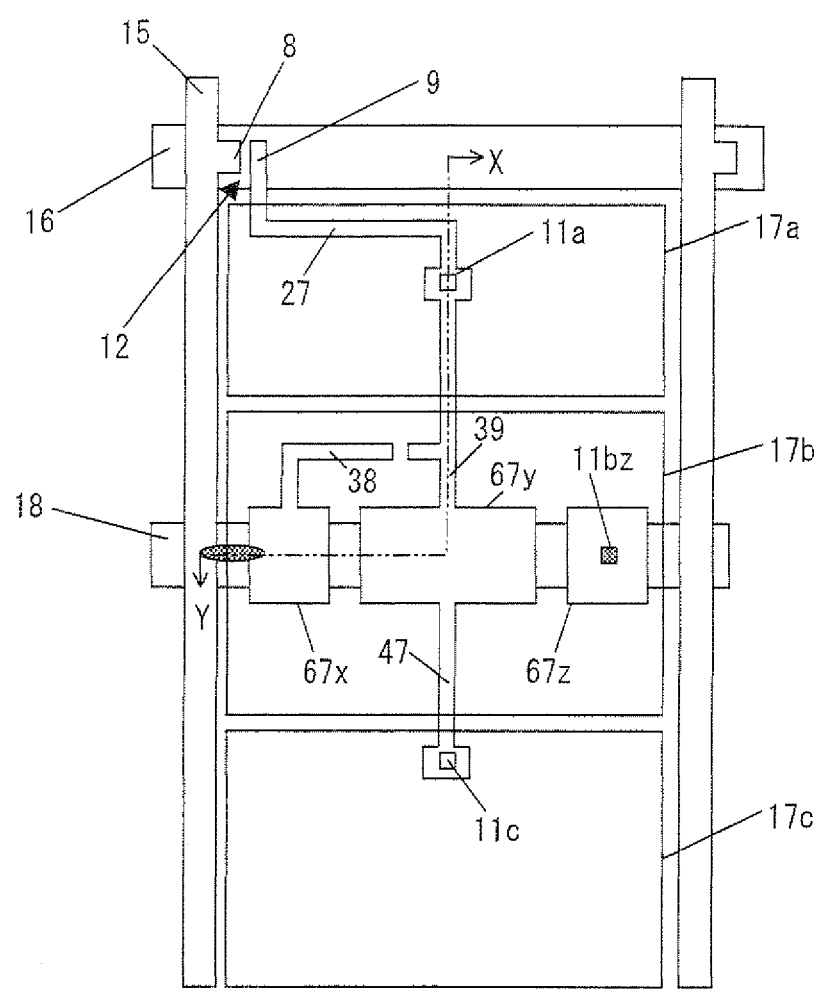
FIG. 6 is a plane drawing showing how to repair the liquid crystal panel shown in FIG. 1.
Figure 7:
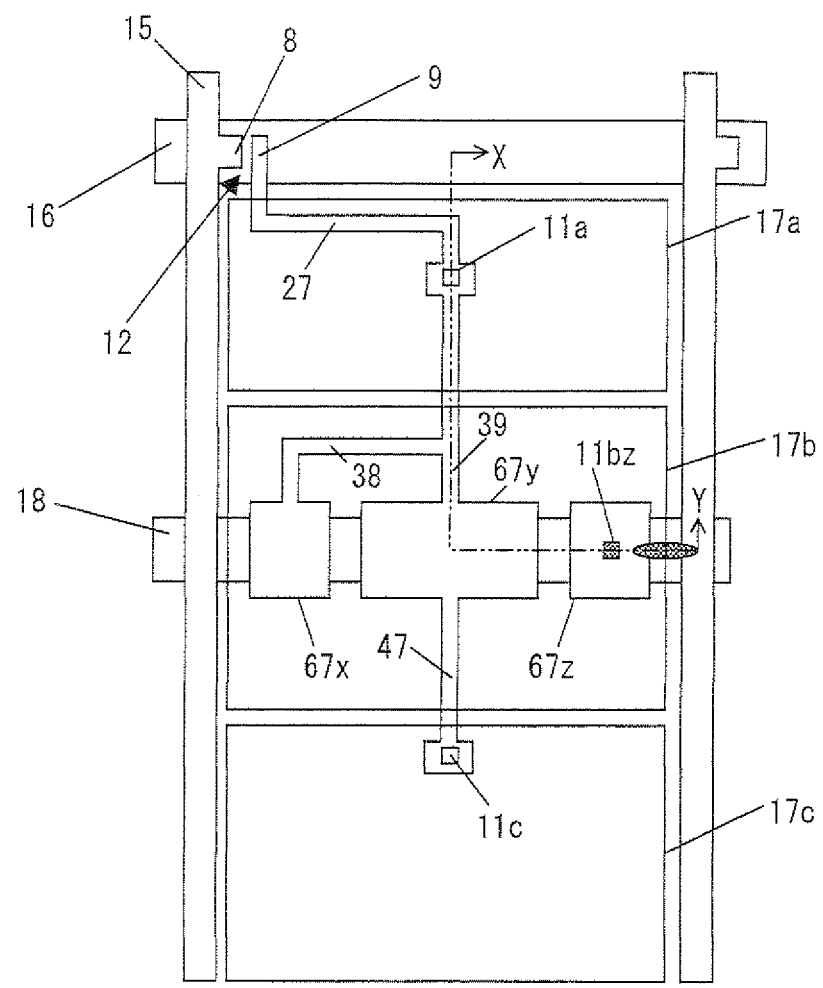
FIG. 7 is a plane drawing showing an example of a defect occurring in the liquid crystal panel shown in FIG. 1.

In the liquid crystal panel shown in FIG. 1, the drain electrode 9 of the transistor, the first pixel electrode 17a, the first connection line 38 connected with the first capacitor electrode 67x, and the second connection line 39 connected with the second capacitor electrode 67y are electrically connected with one another. This configuration allows a short-circuit between a data signal line and the first capacitor electrode 67x adjacent to the data signal line to be repaired without greatly reducing the coupling capacitance and the retention capacitance. That is, if the short-circuit between the data signal line 15 and the first capacitor electrode 67x occurs, the short-circuit can be repaired by cutting the first connection line 38 as shown in FIG. 6. In this case, a second capacitor electrode 67y allows normally controlling potentials of the first-third pixel electrodes 17a-17c (normally driving the three sub-pixels).

Figure 8:
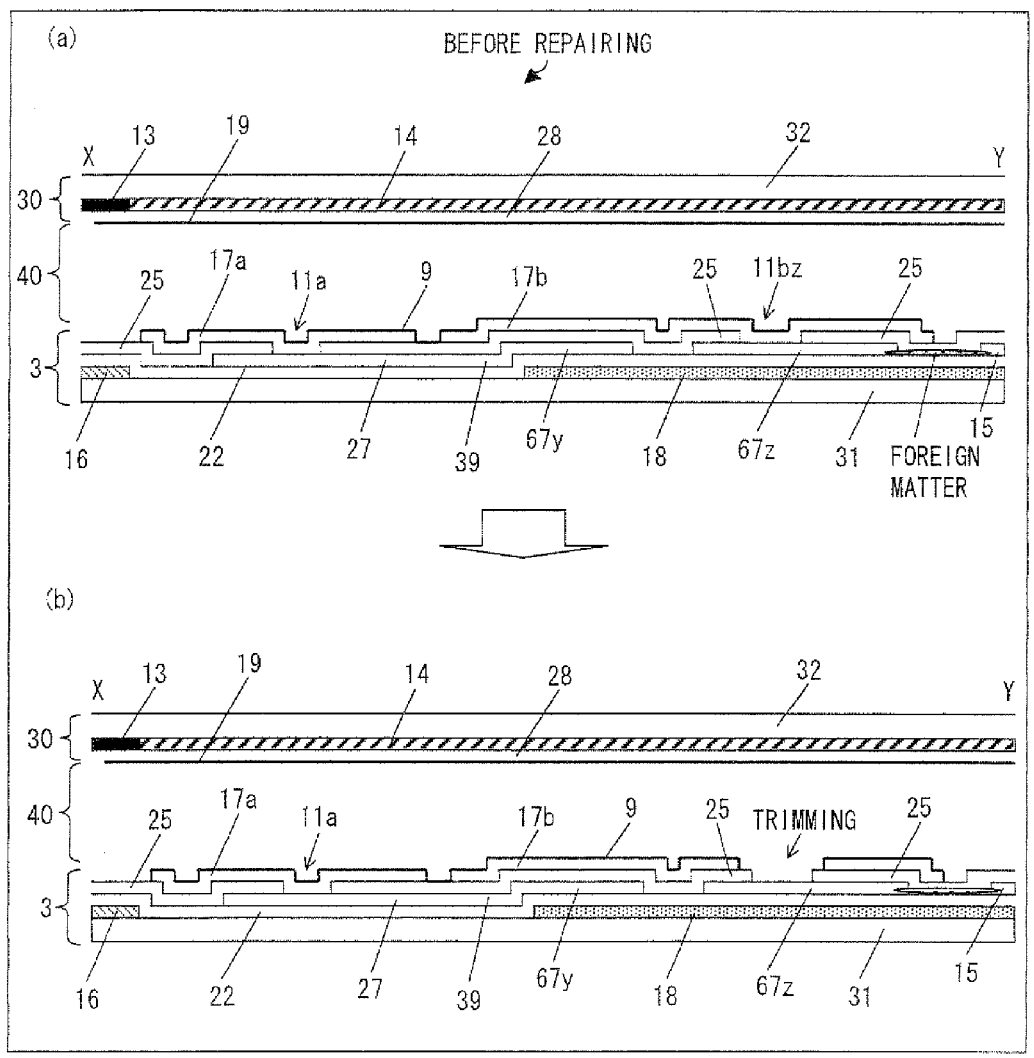
FIG. 8 is a cross sectional drawing showing how to repair the defect shown in FIG. 7.

If a short-circuit between the data signal line 15 and a third capacitor electrode 67z occurs, the short-circuit can be repaired by trimming away a pixel electrode in a contact hole 11bz as shown in (a) and (b) of FIG. 8. In this case, it is possible to normally control potentials of the first-third pixel electrodes 17a-17c (normally drive the three sub-pixels). Further, even if the second capacitor electrode 67y and the third capacitor electrode 67z are short-circuited, only disadvantage is that a potential supplied to the first pixel electrode 17a and the third pixel electrode 17c is also supplied to the second pixel electrode 17b, and there is no disadvantage such that the potential of the first pixel electrode 17a and the third pixel electrode 17c cannot be controlled.

The following explains a process for producing the liquid crystal panel of the present invention. The process includes an active matrix substrate producing step, a color filter substrate producing step, and a fabricating step of attaching the substrates to each other and filling the space between the substrates with liquid crystal to make the liquid crystal panel.

Initially, a metal film such as titanium, chrome, aluminum, molybdenum, tantalum, tungsten, and copper, an alloy film thereof, or a laminate film thereof (with a thickness of 1000 Å-3000 Å) is formed on a substrate made of glass, plastic etc. by sputtering. Thereafter, the film thus formed is patterned by a photolithography technique (Photo Engraving Process. Hereinafter referred to as "PEP technique") to form scanning signal lines, gate electrodes of transistors (in some cases, scanning signal lines double as gate electrodes), and retention capacitor lines.

Subsequently, an inorganic insulating film (with a thickness of approximately 3000 Å-5000 Å) made of silicon nitride or silicon oxide is formed by CVD (Chemical Vapor Deposition) on the whole substrate on which the scanning signal lines have been formed, thereby forming a gate insulating film.

Subsequently, on the gate insulating film (whole substrate), an intrinsic amorphous silicon film (with a thickness of 1000 Å-3000 Å) and an n+ amorphous silicon film (with a thickness of 400 Å-700 Å) doped with phosphorous are continuously formed. Thereafter, the films thus formed are patterned by the PEP technique so as to form a silicon laminate made of an intrinsic amorphous silicon layer and an n+ amorphous silicon layer in such a manner that the silicon laminate has an insular shape.

Subsequently, on the substrate where the silicon laminate has been formed, a metal film such as titanium, chrome, aluminum, molybdenum, tantalum, tungsten, and copper, an alloy film thereof, or a laminate film thereof (with a thickness of 1000 Å-3000 Å) is formed by sputtering. Thereafter, the film thus formed is patterned by the PEP technique so as to form data signal lines, source electrodes and drain electrodes of transistors, drain extracting lines, capacitor electrodes, intermediate lines, and connection lines (metal layers).

Further, using the source electrodes and the drain electrodes as masks, the n+ amorphous silicon layer constituting the silicon laminate is removed by etching so as to form channels for the transistors. The semiconductor layer may be made of the amorphous silicon film as described above. Alternatively, the semiconductor layer may be made of a polysilicon film, or may be made of an amorphous silicon film and a polysilicon film each subjected to a laser annealing in order to improve crystallinity. This increases the moving velocity of electrons in the semiconductor layer, which improves characteristics of the transistor (TFT).

Subsequently, on the whole substrate where the data signal lines etc. have been formed, an inorganic insulating film (with a thickness of 2000 Å-5000 Å) made of silicon nitride or silicon oxide is formed by CVD so as to form an inorganic interlayer insulating film.

Thereafter, the interlayer insulating film is removed by etching by the PEP technique to form contact holes. Then, a transparent conductive film (with a thickness of 1000 Å-2000 Å) made of ITO (Indium Tin Oxide), IZO (Indium Zinc Oxide), zinc oxide, or tin oxide etc. is formed by sputtering on the whole substrate so as to be on the interlayer insulating film where the contact holes have been formed. Thereafter, the transparent conductive film is patterned by the PEP technique to form pixel electrodes.

Lastly, polyimide resin with a thickness of 500 Å-1000 Å is printed on the whole substrate so as to be on the pixel electrodes and thereafter sintered and subjected to a one-direction rubbing treatment by a rotating cloth so as to form an alignment film. Thus, the active matrix substrate is produced.

The following explains the step of producing a color filter substrate.

Initially, a chrome thin film or resin containing a black pigment is formed on a substrate (whole substrate) made of glass, plastic etc. and then the film thus formed is patterned by the PEP technique to form black matrices. Then, at spaces between the black matrices, red, green, and blue color layers (with a thickness of 2 μm or so) are pattern-formed by pigment dispersion etc.

Subsequently, a transparent conductive film (with a thickness of 1000 Å or so) made of ITO, IZO, zinc oxide, or tin oxide etc. is formed on the whole substrate to be on the color filter layers to form a common electrode (com).

Lastly, polyimide resin with a thickness of 500 Å-1000 Å is printed on the whole substrate so as to be on the common electrode, and then sintered and subjected to a one-direction rubbing treatment by a rotating cloth so as to form an alignment film. Thus, the color filter substrate is produced.

The following explains the fabricating step.

Initially, a sealing material made of thermosetting epoxy resin is applied by screen printing to one of the active matrix substrate and the color filter substrate in such a manner that the sealing material forms a frame pattern with a cut via which liquid crystal is to be injected, and spherical spacers made of plastic or silica with a diameter corresponding to the thickness of the liquid crystal layer are dispersed on the other of the substrates.

Subsequently, the active matrix substrate and the color filter substrate are attached to each other and the sealing material is cured.

Lastly, a liquid crystal material is injected into a space surrounded by the active matrix substrate, the color filter substrate, and the sealing material by a vacuum method, and then UV curing resin is applied to the cut via which liquid crystal has been injected, and the substrates are subjected to UV radiation to form a liquid crystal layer therebetween. Thus, the liquid crystal panel is produced.

In at least one of the active matrix substrate producing step and the fabricating step or after the steps, there is carried out an inspection step. If defects such as a short-circuit are detected in the inspection step, there is further carried out a repairing step of repairing the defects.

For example, if a short-circuit between the data signal line 15 and the first capacitor electrode 67x in FIG. 1 is found in the inspection step, there is carried out the repairing step of cutting the first connection line 38 with laser (see FIG. 6). Laser used here is, for example, fourth higher harmonic wave (with a wavelength of 266 nm) of YAG laser (Yttrium Aluminum Garnet). This improves cutting accuracy. The repairing step may be carried out during production of the active matrix substrate (after the step of forming a metal layer), or after the production of the active matrix substrate, or after production of the liquid crystal panel.

If a short-circuit between the data signal line 15 and the third capacitor electrode 67z is found in inspection before forming a pixel electrode, the repairing step may be carried out in the step of forming a metal layer or in the step of forming a channel of a transistor. In this case, the short-circuited part may be removed with laser etc. Repairing a defect at an earlier stage of production as described above allows increasing a process yield of the active matrix substrate.

If a short-circuit between the data signal line 15 and the third capacitor electrode 67z is found in the inspection step after formation of a pixel electrode (e.g. at the time of completion of the active matrix substrate) (see FIG. 7), there may be carried out the repairing step of trimming, with laser etc., a part of the second pixel electrode 17b which part is inside the contact hole 11bz (see (a) and (b) of FIG. 8). If a short-circuit between the data signal line 15 and the third capacitor electrode 67z is found in inspection after completion of the liquid crystal panel, it is difficult to carry out the repairing step of trimming the pixel electrode. This is because YAG laser is absorbed by the color filter (CF) substrate. However, when a configuration such as a CF on array is employed, YAG laser is not absorbed by the color filter substrate. Accordingly, in this case, it is possible to carry out the repairing step of trimming away the pixel electrode with use of third higher harmonic wave or fourth higher harmonic wave of YAG laser.

Figure 9:
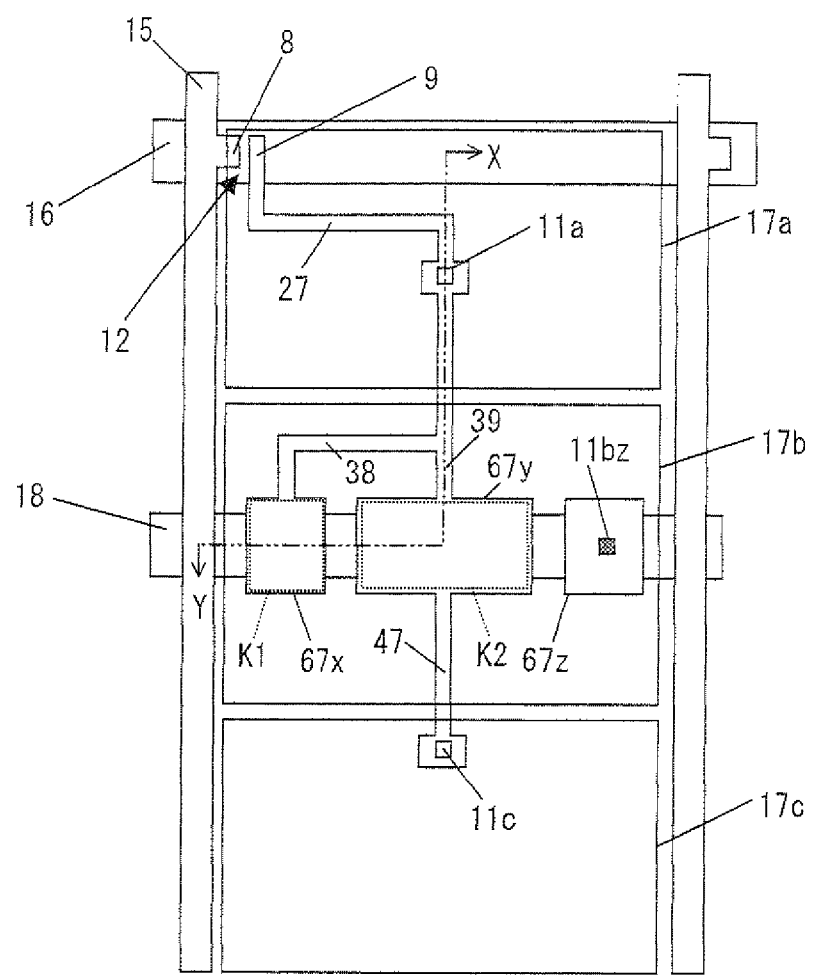
FIG. 9 is a plane drawing showing another specific example of the liquid crystal panel shown in FIG. 1.
Figure 10:
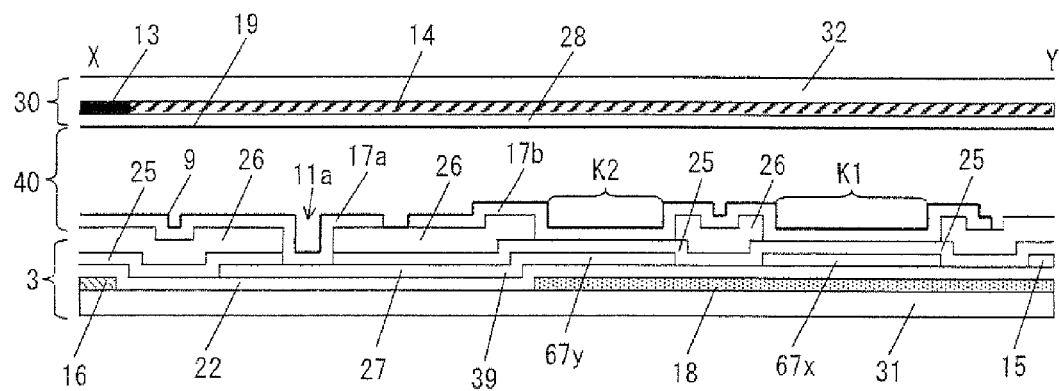
FIG. 10 is a cross sectional drawing showing the liquid crystal panel taken along the line X-Y of FIG. 9.

The interlayer insulating film (channel protecting film) may be arranged such that an organic interlayer insulating film 26 (e.g. acrylic resin) thicker than the inorganic interlayer insulating film 25 in FIG. 2 is formed on the inorganic interlayer insulating film 25 so that the interlayer insulating film has a two-layered (25 and 26) structure as shown in FIG. 10. This yields the effects of reducing various parasitic capacitances, preventing a short-circuit between lines, and reducing crack etc. in the pixel electrode by making the layers under the pixel electrode flat. In this case, as shown in FIGS. 9 and 10, it is preferable to design the organic interlayer insulating film 26 such that a portion K1 overlapping the first capacitor electrode 67x and a portion K2 overlapping the second capacitor electrode 67y are removed. This configuration allows yielding the above effects while securing a sufficient amount of the coupling capacitance (Cc in FIG. 3). In this configuration, a parasitic capacitance between the scanning signal line and the pixel electrode is reduced. Accordingly, it is possible to increase an open area ratio by overlapping the scanning signal line 16 and the first pixel electrode 17a as shown in FIGS. 9 and 10.

The inorganic interlayer insulating film 25, the organic interlayer insulating film 26, and the contact hole 11a in FIG. 10 may be formed as follows for example. Transistors and data signal lines are formed on a substrate, and then the inorganic interlayer insulating film 25 (passivation film) made of SiNx with a thickness of approximately 3000 Å is formed to cover the whole substrate by CVD using a mixture gas of $SiH_4$ gas, $NH_3$ gas, and $N_2$ gas. Thereafter, the organic interlayer insulating film 26 made of positive photosensitive acrylic resin with a thickness of approximately 3 μm is formed by spin coating or die coating. Thereafter, the organic interlayer insulating film 26 is subjected to photolithography so that a hollowed part of the organic interlayer insulating film 26 and various patterns for contact are formed. Further, using the patterned organic interlayer insulating film 26 as a mask, the inorganic interlayer insulating film 25 is dry-etched using a mixture gas of $CF_4$ gas and $O_2$ gas. Specifically, the photolithography process is carried out in such a manner that the hollowed part of the organic interlayer insulating film 26 is made by half exposure so that the organic interlayer insulating film remains thinly in the hollowed part when the development is completed, whereas the contact holes are made by full exposure so that the organic interlayer insulating film does not remain in the contact holes when the development is completed. At this stage, dry etching using the mixture gas of $CF_4$ gas and $O_2$ gas removes the remaining film (of the organic interlayer insulating film) at the hollowed part of the organic interlayer insulating film and the inorganic interlayer insulating film which was below the organic interlayer insulating film at the contact holes. The organic interlayer insulating film 26 may be an insulating film made of an SOG (spin on glass) material. The organic interlayer insulating film 26 may include at least one of acrylic resin, epoxy resin, polyimide resin, polyurethane resin, novolak resin, and siloxane resin.

Figure 11:
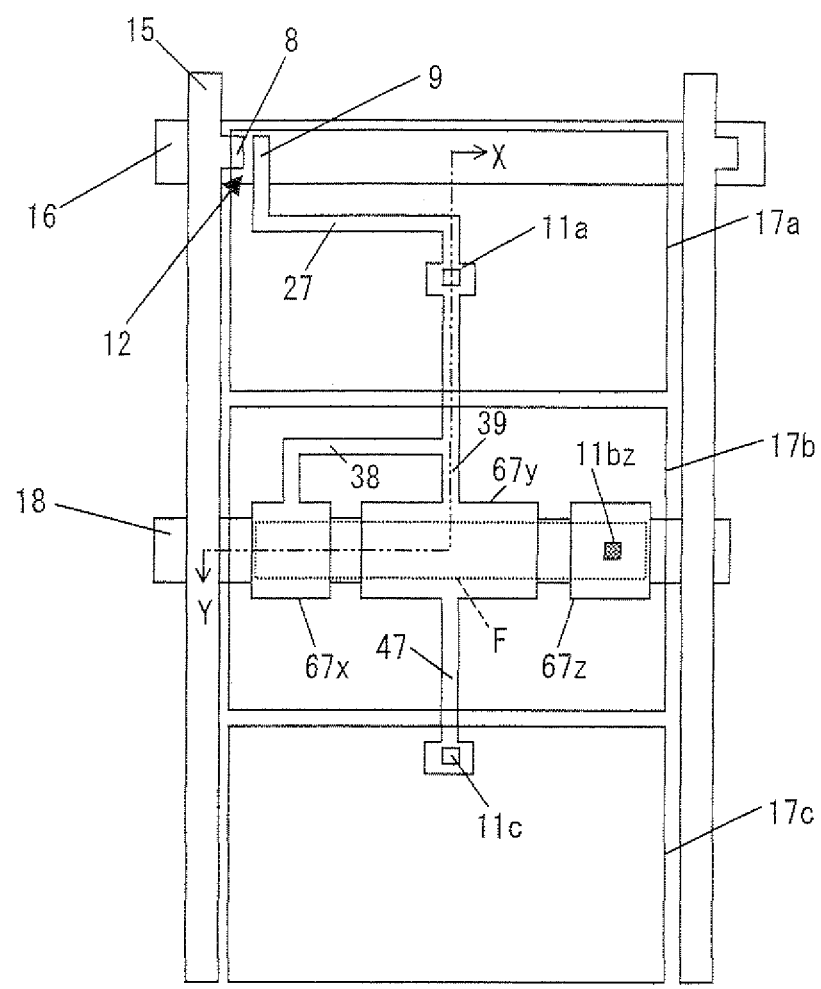
FIG. 11 is a plane drawing showing still another specific example of the liquid crystal panel shown in FIG. 1.
Figure 12:
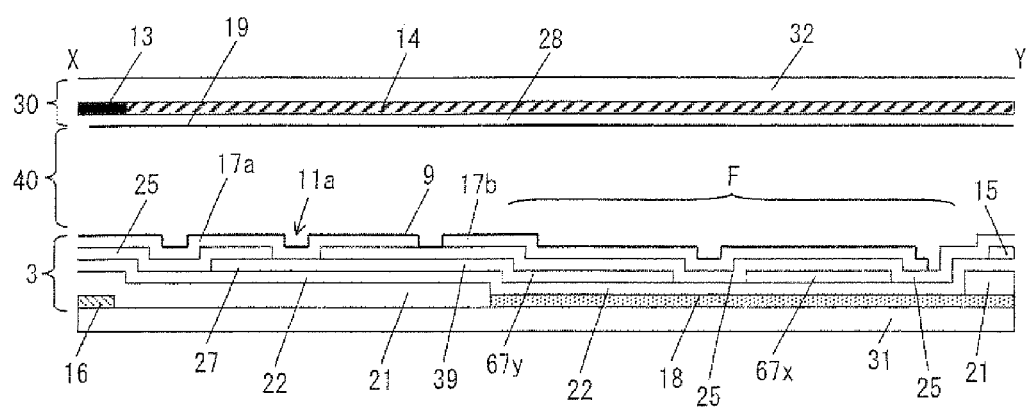
FIG. 12 is a cross sectional drawing showing the liquid crystal panel taken along the line X-Y of FIG. 11.

The gate insulating film may be arranged such that an organic gate insulating film 21 thicker than the inorganic gate insulating film 22 in FIG. 2 is formed below the inorganic gate insulating film 22 so that the gate insulating film has a two-layered (21 and 22) structure as shown in FIG. 12. This yields the effects of reducing various parasitic capacitances, preventing a short-circuit between lines, and reducing disconnection of data signal lines, drain extracting lines etc. by making the layers under the data signal lines, the drain extracting lines etc. flat. In this case, as shown in FIGS. 11 and 12, it is preferable to design the organic gate insulating film 21 such that a portion F overlapping the first-third capacitor electrodes 67x-67z is removed. This configuration allows yielding the above effects while securing a sufficient amount of the coupling capacitance (Ch1 and Ch2 in FIG. 3). In this configuration, a parasitic capacitance between the scanning signal line and the pixel electrode is reduced. Accordingly, it is possible to increase an open area ratio by overlapping the scanning signal line 16 and the first pixel electrode 17*a* as shown in FIGS. 11 and 12.

Figure 13:
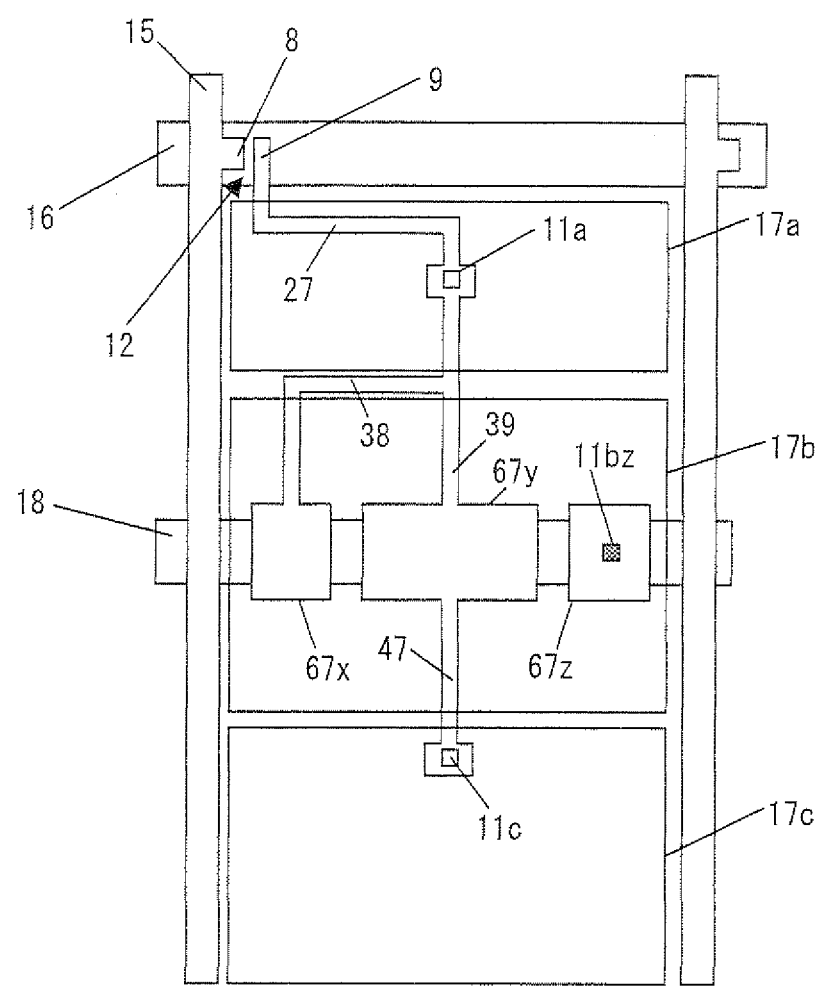
FIG. 13 is a plane drawing showing still another specific example of the liquid crystal panel shown in FIG. 1.

The liquid crystal panel in FIG. 1 may be modified to be a liquid crystal panel in FIG. 13. The liquid crystal panel shown in FIG. 11 is designed such that a part of the first connection line 38 overlaps a gap between the first pixel electrode 17*a* and the second pixel electrode 17*b*. This configuration makes it easier to cut the first connection line 38 and reduces leakage of light from between pixel electrodes.

Figure 14:
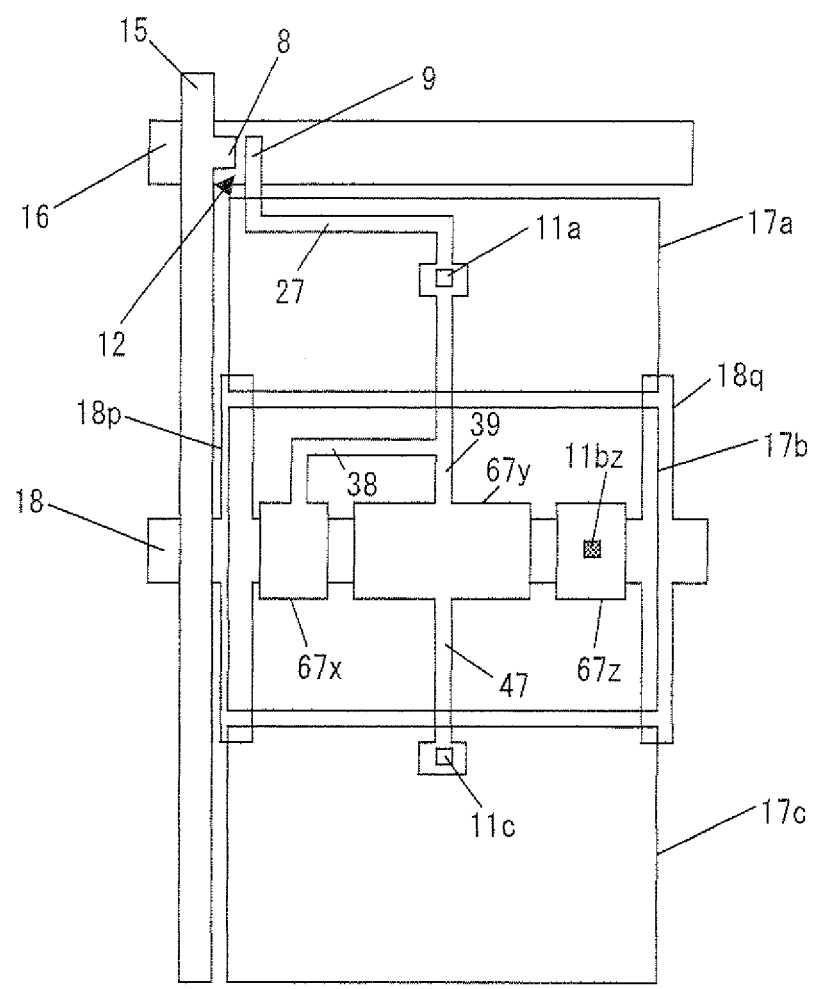
FIG. 14 is a plane drawing showing still another specific example of the liquid crystal panel shown in FIG. 1.

The liquid crystal panel in FIG. 1 may be modified to be a liquid crystal panel in FIG. 14. The liquid crystal panel shown in FIG. 14 is designed such that a retention capacitor line extension 18*p* which extends along the data signal line 15 on a plane view and a retention capacitor line extension 18*q* which extends along a data signal line adjacent to the data signal line 15 on the plane view extend from the retention capacitor line 18 and that the retention capacitor line extension 18*p* overlaps one of two edges of the second pixel electrode 17*b* which edges are along the data signal lines (an edge closer to the data signal line 15), and the retention capacitor line extension 18*q* overlaps the other of the two edges. Consequently, the retention capacitor line extensions 18*p* and 18*q* serve as shield electrodes of the pixel electrode 17*b* (floating pixel electrode), more effectively preventing electric charge from coming into the pixel electrode 17*b*. This allows preventing image sticking of the sub-pixel including the pixel electrode 17*b* (dark sub-pixel).

Figure 15:
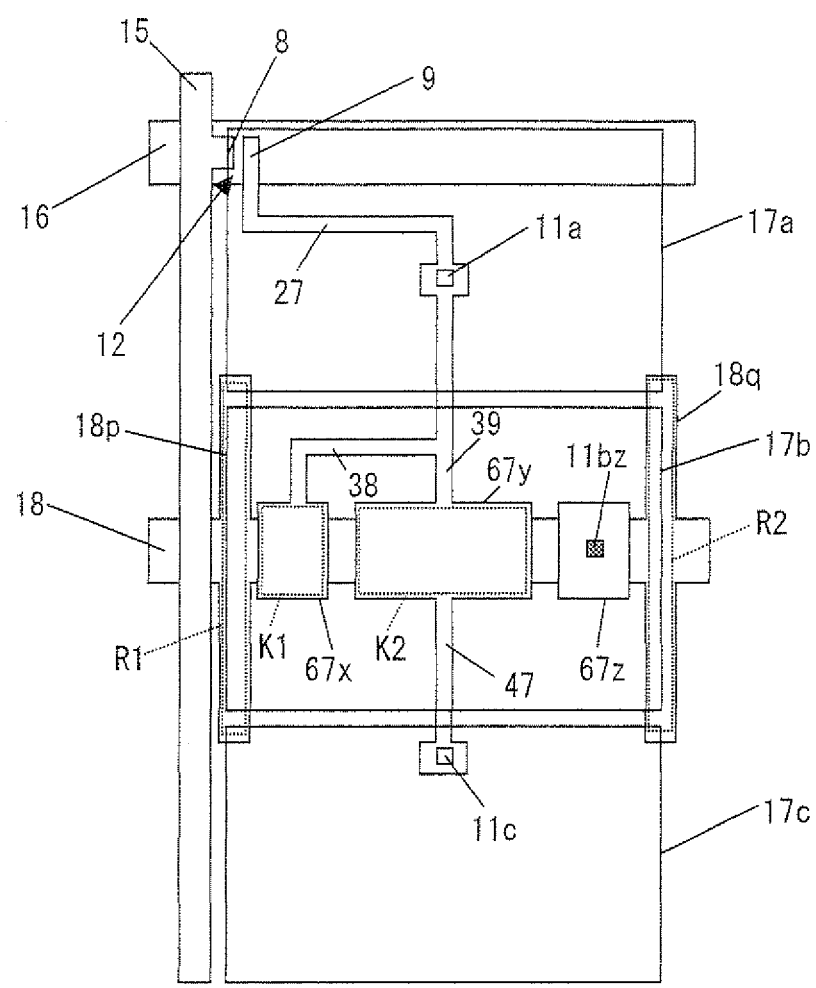
FIG. 15 is a plane drawing showing still another specific example of the liquid crystal panel shown in FIG. 14.

The liquid crystal panel in FIG. 14 may be arranged such that the interlayer insulating film (channel protecting film) has a two-layered structure including an inorganic interlayer insulating film and an organic interlayer insulating film. This configuration yields effects such as reduction of various parasitic capacitances, prevention of a short-circuit between lines, and reduction of breakage etc. of a pixel electrode by making the layers under the pixel electrode flat. In this case, as shown in FIG. 15, it is preferable to design the organic interlayer insulating film such that a portion K1 overlapping the first capacitor electrode 67*x*, a portion K2 overlapping the second capacitor electrode 67*y*, and portions R1 and R2 overlapping the retention capacitor line extensions 18*p* and 18*g* are removed. This configuration allows yielding the above effects while securing a sufficient amount of coupling capacitance (Cc in FIG. 3) and securing the shield effect yielded by the retention capacitor line extensions 18*p* and 18*q*. In this configuration, since parasitic capacitance between the scanning signal line and the pixel electrode is reduced, it is possible to increase an open area ratio by overlapping the scanning signal line 16 and the first pixel electrode 17*a* as shown in FIG. 15.

Figure 16:
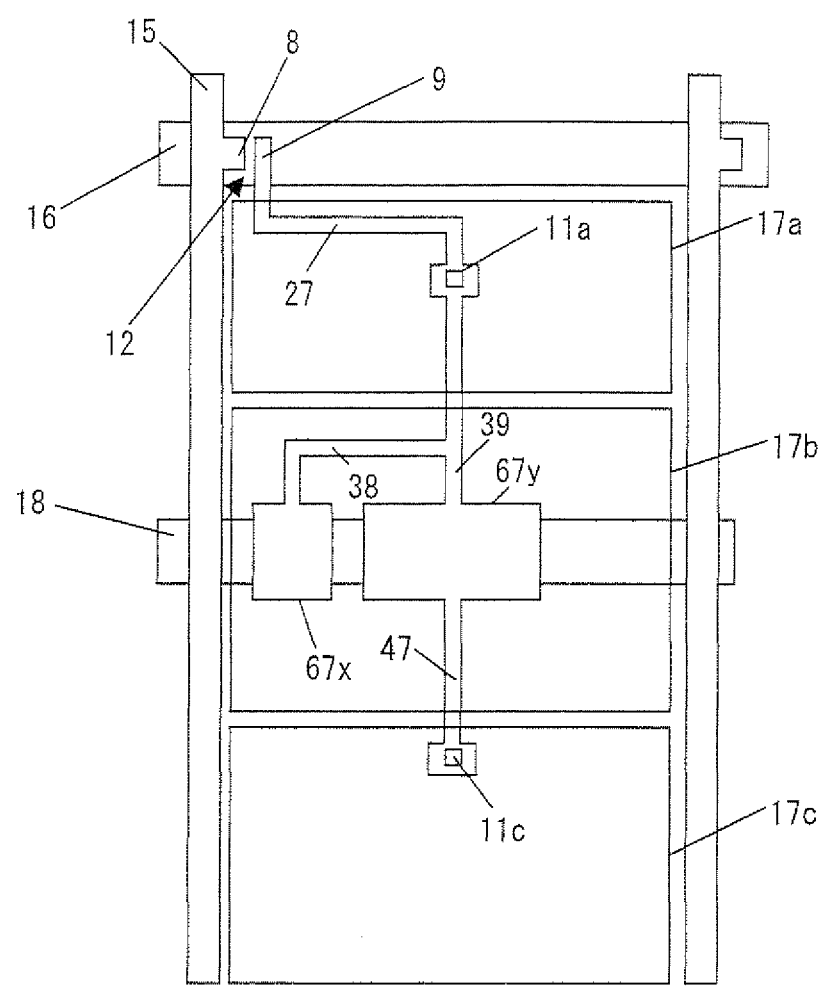
FIG. 16 is a plane drawing showing still another specific example of the liquid crystal panel shown in FIG. 1.

The liquid crystal panel in FIG. 1 may be arranged to be a one shown in FIG. 16 by removing the third pixel capacitor electrode 67*z* and the contact hole 11*bz*. This configuration is preferable in a case where an interlayer insulating film covering a channel of a TFT is relatively thin, since this configuration is designed such that a portion where the retention capacitor line 18 and the second pixel electrode 17*b* overlap forms a retention capacitor. In this configuration, if a short-circuit between the first capacitor electrode 67*x* and a data signal line occurs, cutting the first connection line 38 allows maintaining a capacitive coupling between the first and second pixel electrodes 17*a* and 17*b*. If a short-circuit between the second capacitor electrode 67*y* and a data signal line occurs, cutting the second connection line 39 allows maintaining a capacitive coupling between the first and second pixel electrodes 17*a* and 17*b*. This configuration is free from a short-circuit between the second capacitor electrode 67*y* and the third capacitor electrode 67*z* which may occur in the configuration shown in FIG. 1.

Figure 17:
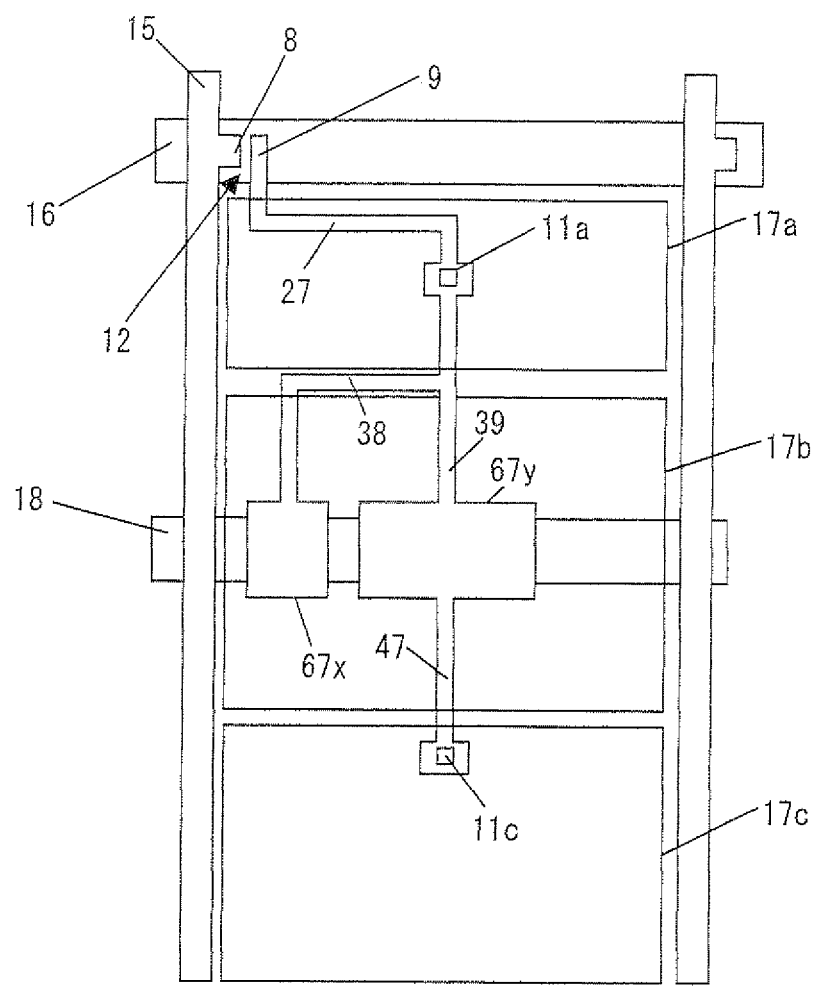
FIG. 17 is a plane drawing showing still another specific example of the liquid crystal panel shown in FIG. 16.

The liquid crystal display panel in FIG. 16 may be modified to be a one as shown in FIG. 17. The liquid crystal panel shown in FIG. 17 is designed such that the first connection line 38 which connects with the first capacitor electrode 67*x* adjacent to the data signal line partially overlaps a gap between the first pixel electrode 17*a* and the second pixel electrode 17*b*. This configuration makes it easy to cut the first connection line 38 and reduces leakage of light from between the pixel electrodes.

Figure 18:
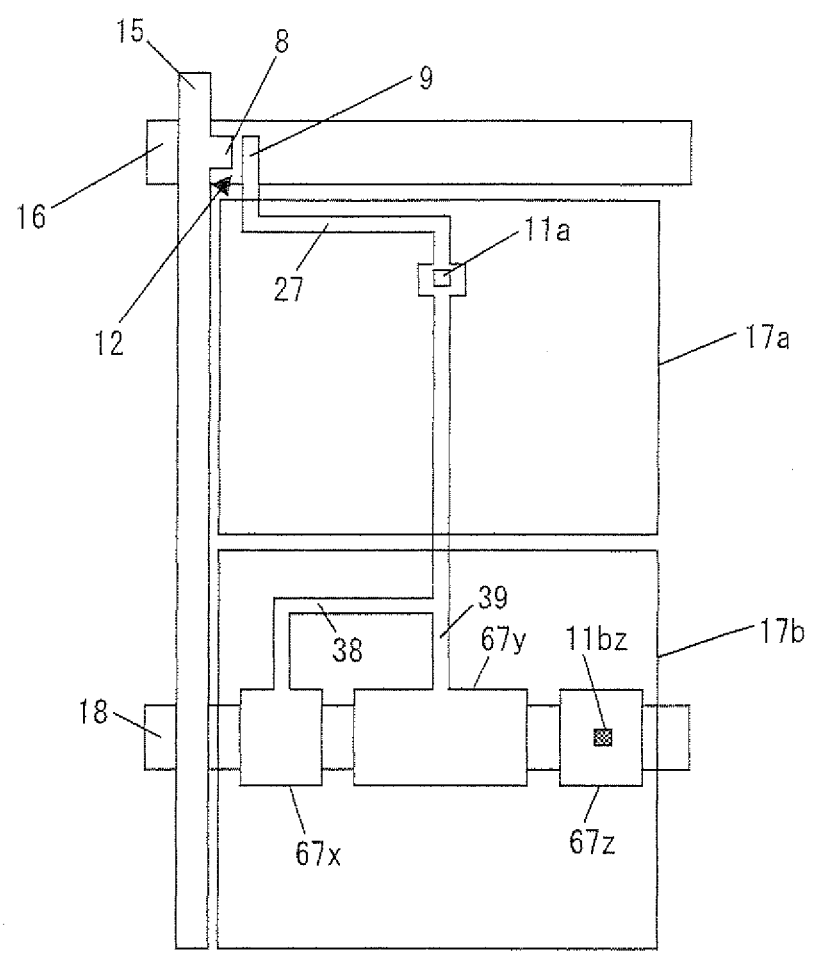
FIG. 18 is a plane drawing showing still another specific example of the liquid crystal panel shown in FIG. 1.

The liquid crystal panel in FIG. 1 may be modified to be a one shown in FIG. 18 by removing the third pixel electrode 17*c*, the intermediate line 47, and the contact hole 11*c*. A liquid crystal display device including the liquid crystal panel in FIG. 18 can display a halftone by an area coverage modulation of one bright sub-pixel which is a sub-pixel including the pixel electrode 17*a* and one dark sub-pixel which is a sub-pixel including the pixel electrode 17*b*.

Figure 19:
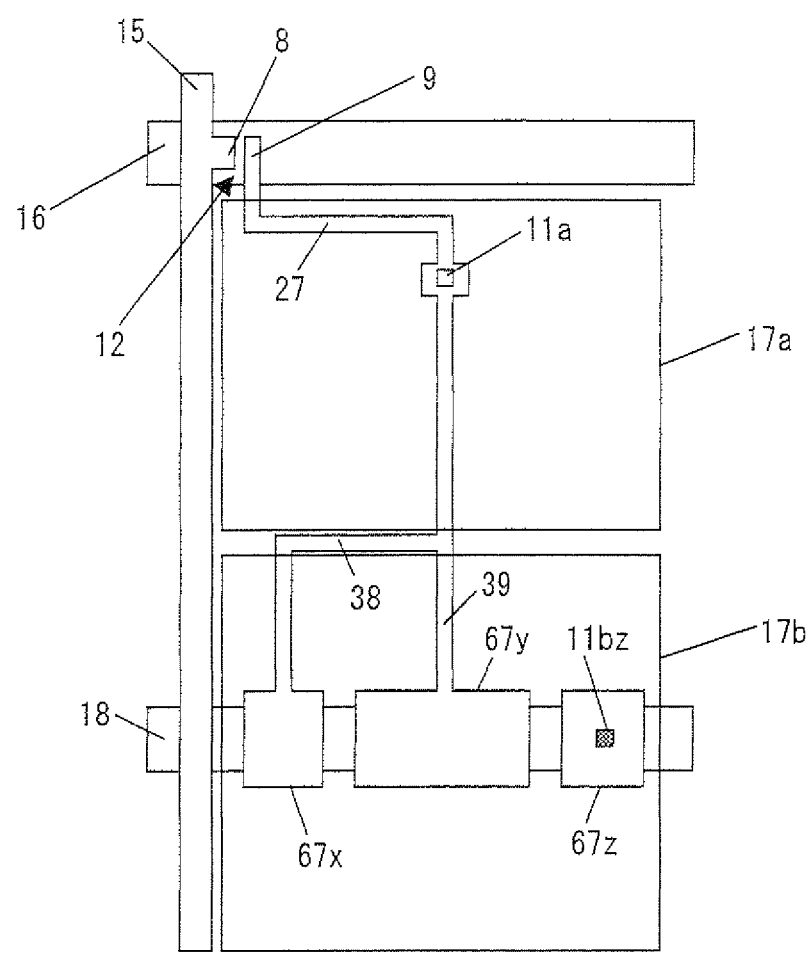
FIG. 19 is a plane drawing showing still another specific example of the liquid crystal panel shown in FIG. 18.
Figure 25:
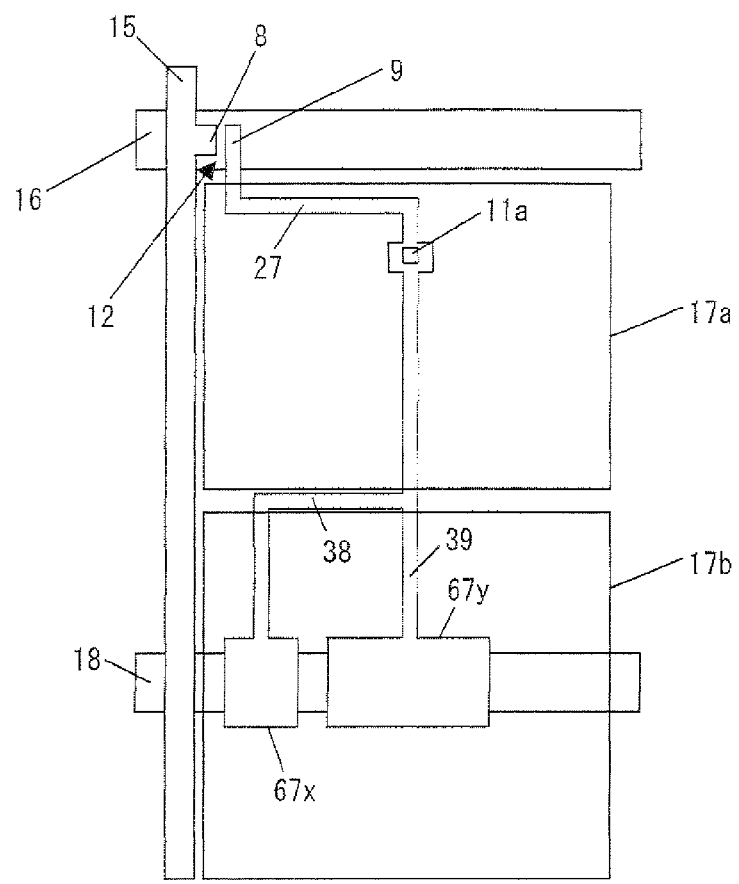
FIG. 25 is a plane drawing showing a modification example of the liquid crystal panel shown in FIG. 18.

The liquid crystal panel in FIG. 18 may be modified to be a one shown in FIG. 19. The liquid crystal panel shown in FIG. 19 is designed such that the first connection line 38 which connects with the first capacitor electrode 67*x* adjacent to the data signal line partially overlaps a gap between the first pixel electrode 17*a* and the second pixel electrode 17*b*. This configuration makes it easy to cut the first connection line 38 and reduces leakage of light from between the pixel electrodes. The liquid crystal panel in FIG. 19 may be modified to be a one as shown in FIG. 25 by removing the third capacitor electrode 67*z* and the contact hole 11*bz*. This configuration is preferable in a case where an interlayer insulating film covering a channel of a TFT is relatively thin, since this configuration is designed such that a portion where the retention capacitor line 18 and the second pixel electrode 17*b* overlap forms a retention capacitor.

Figure 20:
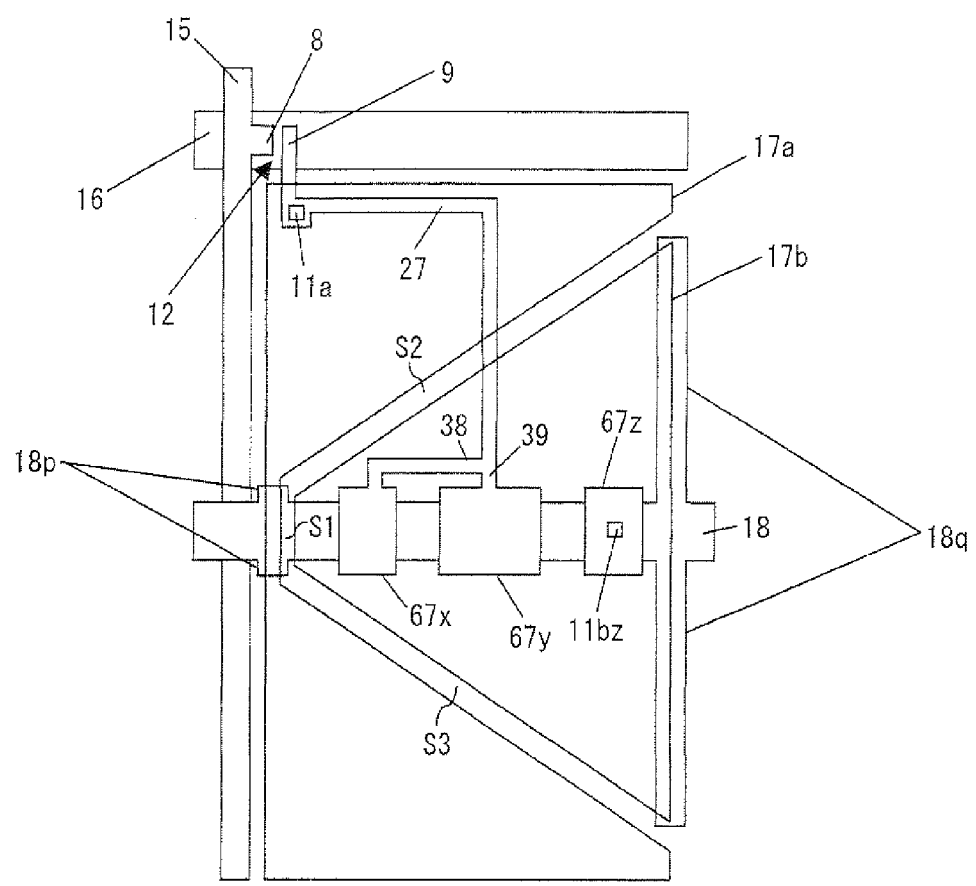
FIG. 20 is a plane drawing showing another configuration of the liquid crystal panel of the present invention.

FIG. 20 is a plane drawing showing another configuration of the liquid crystal panel of the present invention. As shown in the drawing, in a pixel region defined by the data signal line 15 and the scanning signal line 16, a second pixel electrode 17*b* having a trapezoidal shape as seen from a row direction and a first pixel electrode 17*a* having a shape to which the second pixel electrode 17*b* fits are aligned in a row direction, and the retention capacitor line 18 extends in a row direction in such a manner as to cross the center of a pixel (to overlap the second pixel electrode 17*b*).

That is, the circumference of the second pixel electrode 17*b* is composed of a first side which crosses the retention capacitor line 18 and forms an angle of approximately 90° with respect to a row direction, a second side which extends from one end of the first side in such a manner as to form an angle of approximately 45° with respect to a row direction, a third side which extends from the other end of the first side in such a manner as to form an angle of approximately 315° with respect to a row direction, and a fourth side which is parallel to the first side and crosses the retention capacitor line 18. The first side forms an upper base of the trapezoid and the fourth side forms a lower base of the trapezoid, and a line connecting medians of the first side and the fourth side runs on the retention capacitor line 18.

Further, the circumference of the first pixel electrode 17*a* is composed of a side along the data signal line 15, a side along the scanning signal line 16, a side along a scanning signal line adjacent to the scanning signal line 16, and three sides facing the first-third sides of the second pixel electrode 17*b*. A gap between the first side of the second pixel electrode 17*b* and the side of the first pixel electrode 17*a* which side faces the first side of the second pixel electrode 17b is referred to as a first gap S1, a gap between the second side of the second pixel electrode 17b and the side of the first pixel electrode 17a which side faces the second side of the second pixel electrode 17b is referred to as a second gap S2, and a gap between the third side of the second pixel electrode 17b and the side of the first pixel electrode 17a which side faces the third side of the second pixel electrode 17b is referred to as a third gap S3.

The first-third capacitor electrodes 67x-67z are aligned in this order in a row direction in such a manner as to overlap the retention capacitor line 18 via a gate insulating film (not shown), and each of the first-third capacitor electrodes 67x-67z overlaps the second pixel electrode 17b via an interlayer insulating film (not shown). That is, the second capacitor electrode 67y is positioned below a center portion of the second pixel electrode 17b, the first capacitor electrode 67x is positioned between one of two adjacent data signal lines (data signal line 15) and the second capacitor electrode 67y, and the first capacitor electrode 67z is positioned between the other of the two adjacent data signal lines and the second capacitor electrode 67y. That is, a distance between the first capacitor electrode 67x and the data signal line 15 closest to the first capacitor electrode 67x is smaller than a distance between the second capacitor electrode 67y and the data signal line 15 closest to the second capacitor electrode 67y. Further, a source electrode 8 of the transistor 12 is connected with the data signal line, a drain electrode 9 is connected with the second capacitor electrode 67y via a drain extracting line 27, and the drain extracting line 27 is connected with the pixel electrode 17a via a contact hole 11a. Further, the drain extracting line 27 is connected with a first connection line 38 on a plane where both the drain extracting line 27 and the first connection line 38 exist, and is also connected with a second connection line 39 on the plane. The first connection line 38 is connected with the first capacitor electrode 67x, and the second connection line 39 is connected with the first capacitor electrode 67y. The first and second connection lines 38 and 39 are positioned in such a manner as not to overlap the retention capacitor line 18. This configuration allows the drain electrode 9 of the transistor 12, the first pixel electrode 17a, the first connection line 38, and the second connection line 39 to be electrically connected with one another, so that coupling capacitance is formed at a portion where the first capacitor electrode 67x and the second pixel electrode 17b overlap each other and at a portion where the second capacitor electrode 67y and the second pixel electrode 17b overlap each other. Further, a retention capacitor is formed at a portion where the first and second capacitor electrodes 67x and 67y overlap the retention capacitor line 18.

Further, the third capacitor electrode 67z is connected with the second pixel electrode 17b via the contact hole 11 bz, and consequently a retention capacitor is formed at a portion where the third capacitor electrode 67z overlaps the retention capacitor line 18.

Further, a retention capacitor line extension 18p extends from the retention capacitor line 18 in such a manner as to be along the data signal line 15 on a plane view, and a retention capacitor line extension 18q extends from the retention capacitor line 18 in such a manner as to be along the data signal line adjacent to the data signal line 15 on a plane view. The retention capacitor line extension 18p overlaps the first side of the circumference of the second pixel electrode 17b, and the retention capacitor line extension 18q overlaps the fourth side of the circumference of the second pixel electrode 17b.

In the liquid crystal panel shown in FIG. 20, the drain electrode 9 of the transistor, the first pixel electrode 17a, the first connection line 38 connected with the first capacitor electrode 67x, and the second connection line 39 connected with the second capacitor electrode 67y are electrically connected with one another. This configuration allows a short-circuit between a data signal line and a capacitor electrode closer to the data signal line (i.e. the first capacitor electrode 67x) to be repaired while maintaining coupling capacitance and retention capacitance. That is, if the short-circuit between the data signal line 15 and the first capacitor electrode 67x occurs, the short-circuit can be repaired by cutting the first connection line 38. In this case, the second capacitor electrode 67y allows normally controlling potentials of the first and second pixel electrodes 17a and 17b (normally driving the two sub-pixels).

If a short-circuit between the data signal line 15 and a third capacitor electrode 67z occurs, the short-circuit can be repaired by trimming away a pixel electrode in a contact hole 11bz. In this case, it is possible to normally control potentials of the first and second pixel electrodes 17a and 17b (normally drive the two sub-pixels). Further, even if the second capacitor electrode 67y and the third capacitor electrode 67z are short-circuited, only disadvantage is that a potential supplied to the first pixel electrode 17a is also supplied to the second pixel electrode 17b, and there is no disadvantage such that the potentials of the first pixel electrode 17a and the second pixel electrode 17b cannot be controlled.

In a case where the liquid crystal panel in FIG. 20 is used based on MVA, the second gap S2 or the third gap S3 may serve as an alignment controlling structure. Further, since the retention capacitor line extensions 18p and 18q serve as shield electrodes of the pixel electrode 17b (floating pixel electrode), it is possible to more effectively prevent electric charge from coming into the second pixel electrode 17b. This allows preventing image sticking of the sub-pixel including the pixel electrode 17b (dark sub-pixel).

The liquid crystal panel in FIG. 20 may be arranged such that the interlayer insulating film (channel protecting film) has a two-layered structure including an inorganic interlayer insulating film and an organic interlayer insulating film. This configuration yields effects such as reduction of various parasitic capacitances, prevention of a short-circuit between lines, and reduction of breakage etc. of a pixel electrode by making the layers under the pixel electrode flat. In this case, it is preferable to design the organic interlayer insulating film such that a portion overlapping the first capacitor electrode 67x, a portion overlapping the second capacitor electrode 67y, and portions overlapping the retention capacitor line extensions 18p and 18q are removed. This configuration allows yielding the above effects while securing a sufficient amount of coupling capacitance and securing the shield effect yielded by the retention capacitor line extensions 18p and 18q.

Figure 21:
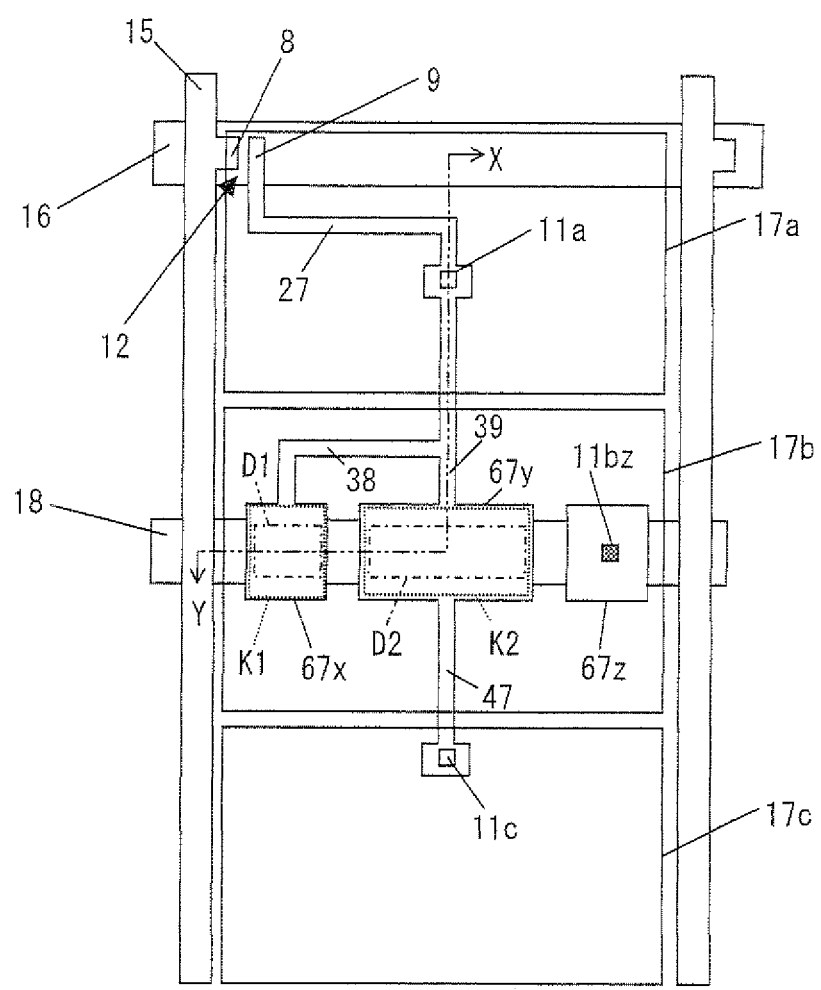
FIG. 21 is a plane drawing showing another specific example of the liquid crystal panel shown in FIG. 9.
Figure 22:
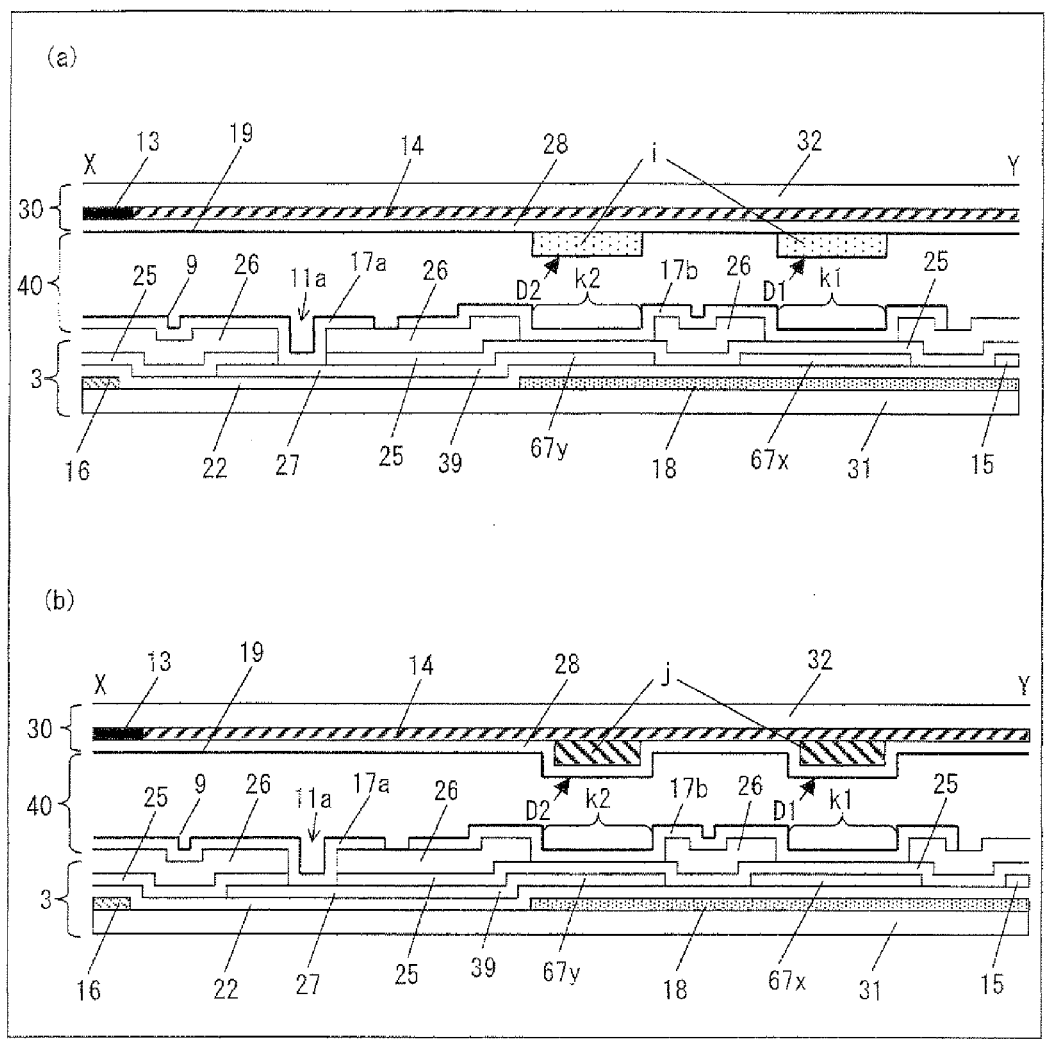
FIG. 22 is a cross sectional drawing showing the liquid crystal panel taken along the line X-Y of FIG. 21.

The liquid crystal panel shown in FIGS. 9 and 10 may be modified to be a one shown in FIGS. 21 and 22. The liquid crystal panel shown in FIGS. 21 and 22 is designed such that a surface of a color filter substrate has protrusions D1 and D2 corresponding to hollowed parts K1 and K2 of an organic interlayer insulating film 26 of the active matrix substrate 3. This configuration allows compensating recesses on the surface of the active matrix substrate which are made by the hollowed parts K1 and K2, allowing a liquid crystal layer under the protrusions D1 and D2 to have substantially the same thickness as its surroundings. This allows the liquid crystal layer to have a uniform thickness, which reduces the amount of used liquid crystal. In (a) of FIG. 22, protruding members i are provided on the counter electrode 28 to serve as the protrusions D1 and D2. This allows preventing a short-circuit between the second pixel electrode 17b and the counter electrode 28 even if a conductive foreign matter falls in the recess on the surface of the active matrix substrate which recess is caused by the hollowed part K. In a case of a liquid crystal panel based on MVA, the protruding members may be made in the same step (from the same material) as that for ribs for alignment control (e.g. phenol novolak resin). In (b) of FIG. 22, protruding members j are formed on a colored layer 14 (under a counter electrode 28) to serve as the protrusions D1 and D2 on the surface of the color filter substrate. The protruding members j may be a colored layer with a color different from that of the colored layer 14 so that the protrusions D1 and D2 are made by overlapping these colored layers (e.g. a colored layer of R and a colored layer of G). This configuration is advantageous in that the protruding members are not required to be made separately (made of a different material). The configuration in (b) of FIG. 22 allows making the distance between the second pixel electrode 17b and the counter electrode 28 under the protrusions D1 and D2 shorter than the case where the protrusions D1 and D2 are not provided. This allows increasing liquid crystal capacitance.

As shown in FIG. 21, in order that alignment defect caused by the protrusions D1 and D2 of the color filter substrate is less visible, it is desirable to position the protrusions D1 and D2 in such a manner that projections of the protrusions D1 and D2 onto a layer where the retention capacitor line 18 is formed are positioned between two edges of the retention capacitor line 18 in a row direction.

Figure 23:
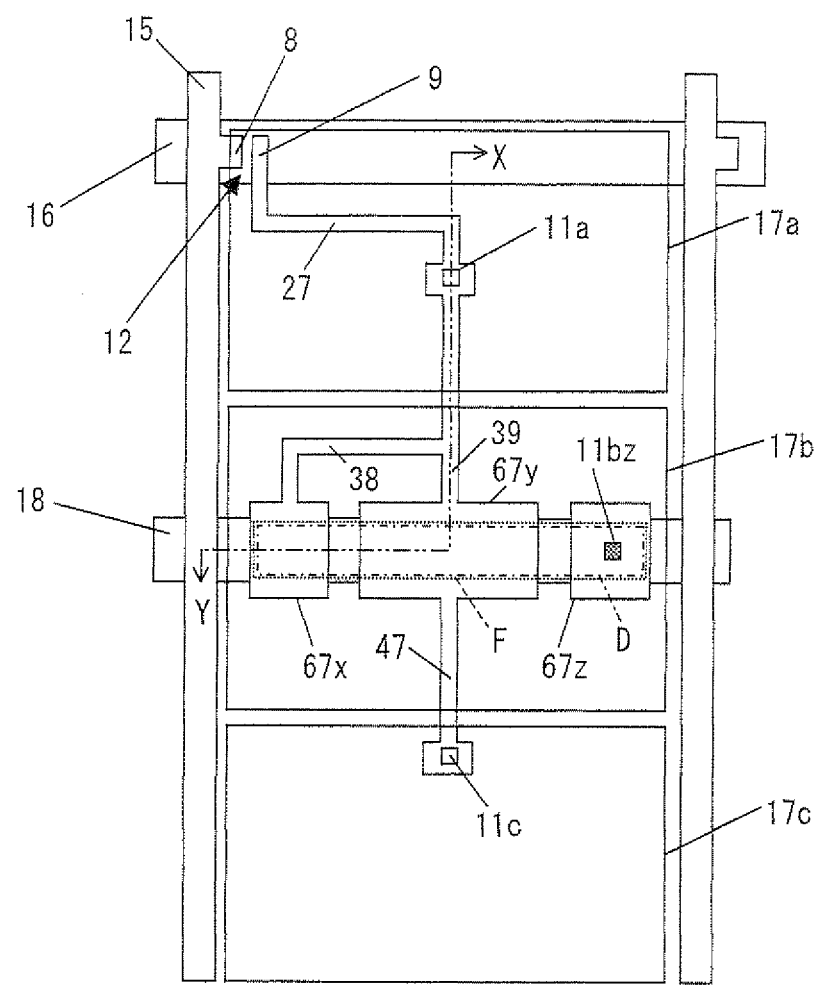
FIG. 23 is a plane drawing showing another specific example of the liquid crystal panel shown in FIG. 11.
Figure 24:
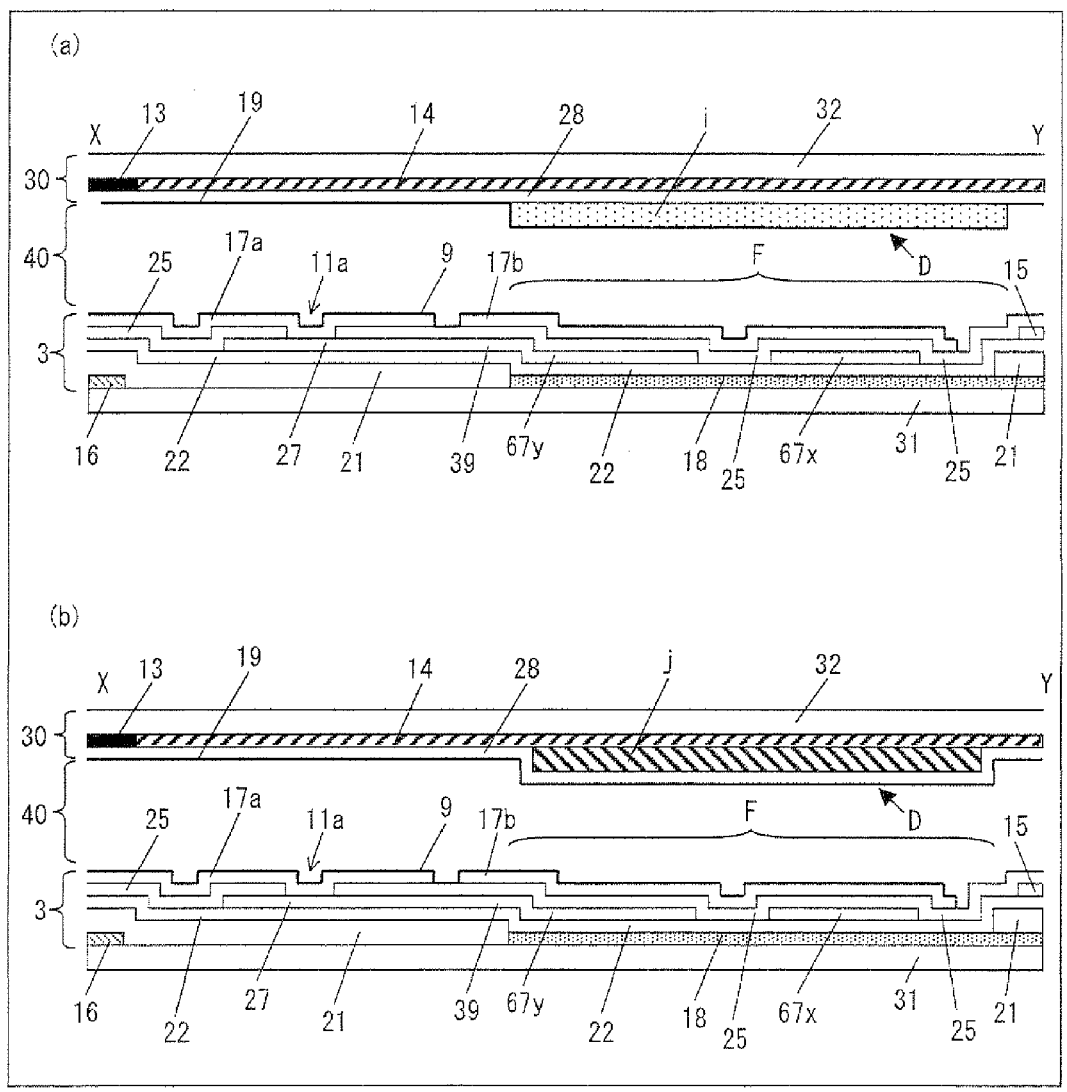
FIG. 24 is a cross sectional drawing showing the liquid crystal panel taken along the line X-Y of FIG. 23.

The liquid crystal panel shown in FIGS. 11 and 12 may be modified to be a one shown in FIGS. 23 and 24. The liquid crystal panel shown in FIGS. 23 and 24 is designed such that a surface of a color filter substrate has a protrusion D corresponding to a hollowed part F of an organic gate insulating film 21 of the active matrix substrate 3. This configuration allows compensating a recess on the surface of the active matrix substrate which recess is made by the hollowed part F, allowing a liquid crystal layer under the protrusion D to have substantially the same thickness as its surroundings. This allows the liquid crystal layer to have a uniform thickness, which reduces the amount of used liquid crystal. In (a) of FIG. 24, a protruding member i is provided on the counter electrode 28 to serve as the protrusion D. This allows preventing a short-circuit between the second pixel electrode 17b and the counter electrode 28 even if a conductive foreign matter falls in the recess on the surface of the active matrix substrate which recess is caused by the hollowed part F. In a case of a liquid crystal panel based on MVA, the protruding member i may be made in the same step as that for a rib for alignment control. In (b) of FIG. 24, a protruding member j is formed on a colored layer 14 (under a counter electrode 28) to serve as the protrusion D on the surface of the color filter substrate. The protruding member j may be a colored layer with a color different from that of the colored layer 14 so that the protrusion D is made by overlapping these colored layers (e.g. a colored layer of R and a colored layer of G). This configuration is advantageous in that the protruding member is not required to be made separately (made of a different material). The configuration in (b) of FIG. 24 allows making the distance between the second pixel electrode 17b and the counter electrode 28 under the protrusion D shorter than the case where the protrusion D is not provided. This allows increasing liquid crystal capacitance.

As shown in FIG. 23, in order that alignment defect caused by the protrusion D of the color filter substrate is less visible, it is desirable to position the protrusion D in such a manner that projection of the protrusion D onto a layer where the retention capacitor line 18 is formed is positioned between two edges of the retention capacitor line 18 in a row direction.

Figure 26:
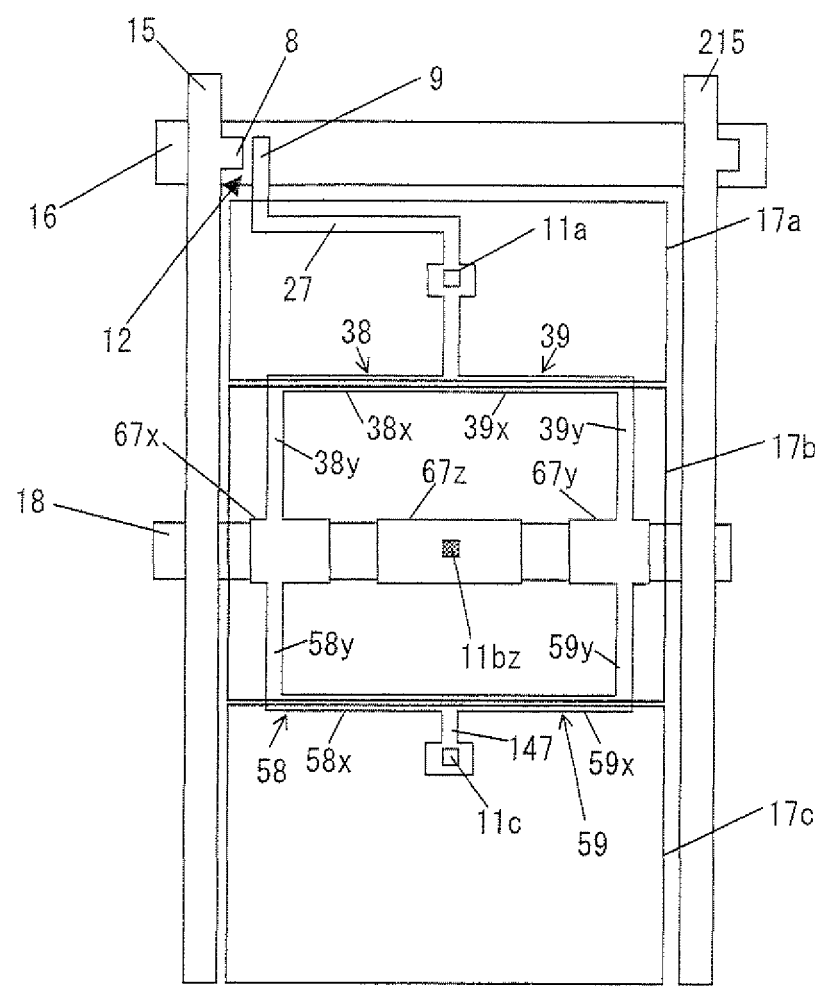
FIG. 26 is a plane drawing showing a modification example of the liquid crystal panel shown in FIG. 1.

The liquid crystal panel of the present invention may be arranged as shown in FIG. 26. That is, the liquid crystal panel of the present invention may be arranged such that first-third pixel electrodes 17a-17c each having a rectangular shape are aligned in this order in a column direction, a first capacitor electrode 67x, a third capacitor electrode 67z, and a second capacitor electrode 67y are aligned in this order in a row direction in such a manner as to overlap a gate insulating film (not shown) via a gate insulating film (not shown), and each of the first-third capacitor electrodes 67x-67z overlaps the second pixel electrode 17b via an interlayer insulating film (not shown). Further, the third capacitor electrode 67z is positioned under a center portion of the second pixel electrode 17b, and the first capacitor electrode 67x is positioned between one of adjacent two data signal lines (data signal line 15) and the third capacitor electrode 67z, and the second capacitor electrode 67y is positioned between the other of the adjacent two data signal lines (data signal line 215) and the third capacitor electrode 67z. Further, a source electrode 8 of a transistor 12 is connected with the data signal line 15, and a drain electrode 9 is connected with a drain extracting line 27 on a layer where the drain electrode 9 and the drain extracting line 27 exists, and the drain extracting line 27 is connected with the pixel electrode 17a via a contact hole 11a.

Further, a first connection line 38 has an L-shape, and composed of: a lateral extension 38x extending in the same direction as a scanning signal line 16 extends; and a longitudinal extension 38y extending along the data signal line 15. A second connection line 39 has an L-shape, and composed of: a lateral extension 39x extending in the same direction as the scanning signal line 16 extends; and a longitudinal extension 39y extending along the data signal line 215.

One end of the first connection line 38 (an end closer to the lateral extension 38x) is connected with the drain extracting line 27, and the other end (closer to the longitudinal extension 38y) is connected with the first capacitor electrode 67x. One end of the second connection line 39 (an end, closer to the lateral extension 39x) is connected with the drain extracting line 27, and the other end (closer to the longitudinal extension 39y) is connected with the second capacitor electrode 67y.

Further, a third connection line 58 has an L-shape, and composed of a longitudinal extension 58y extending along the data signal line 15 and a lateral extension 58x extending in the same direction as the scanning signal line 16 extends. A fourth connection line 59 has an L-shape, and composed of a longitudinal extension 59y extending along the data signal line 215 and a lateral extension 59x extending in the same direction as the scanning signal line 16 extends.

One end of the third connection line 58 (an end closer to the longitudinal extension 58y) is connected with the first capacitor electrode 67x, and the other end (closer to the lateral extension 58x) is connected with the intermediate line 147. One end of the fourth connection line 59 (an end closer to the longitudinal extension 59y) is connected with the second capacitor electrode 67y, and the other end (closer to the lateral extension 59x) is connected with the intermediate line 147. Further, the intermediate line 147 is connected with the third pixel electrode 17c via a contact hole 11c.

The lateral extension 38x of the first connection line 38 and the lateral extension 39x of the second connection line 39 are positioned below a gap between the first pixel electrode 17a and the second pixel electrode 17b, and do not overlap the retention capacitor line 18. Further, the lateral extension 58x of the third connection line 58 and the lateral extension 59x of the fourth connection line 59 are positioned below a gap between the second pixel electrode 17b and the third pixel electrode 17c, and do not overlap the retention capacitor line 18.

Consequently, the drain electrode 9 of the transistor 12, the first pixel electrode 17a, the first connection line 38, and the second connection line 39 are electrically connected with one another, so that a coupling capacitance Cc (see FIG. 3) is formed at a portion where the first capacitor electrode 67x and the second pixel electrode 17b overlap each other and a portion where the second capacitor electrode 67y and the second pixel electrode 17b overlap each other. Further, a retention capacitor Ch1 (see FIG. 3) is formed at a portion where the first and second capacitor electrodes 67x and 67y overlap the retention capacitor line 18.

Further, the third capacitor electrode 67z and the second pixel electrode 17b are connected with each other via the contact hole 11bz. This forms a much amount of a retention capacitor Ch2 (see FIG. 3) at a portion where the third capacitor electrode 67z and the retention capacitor line 18 overlap each other.

Figure 27:
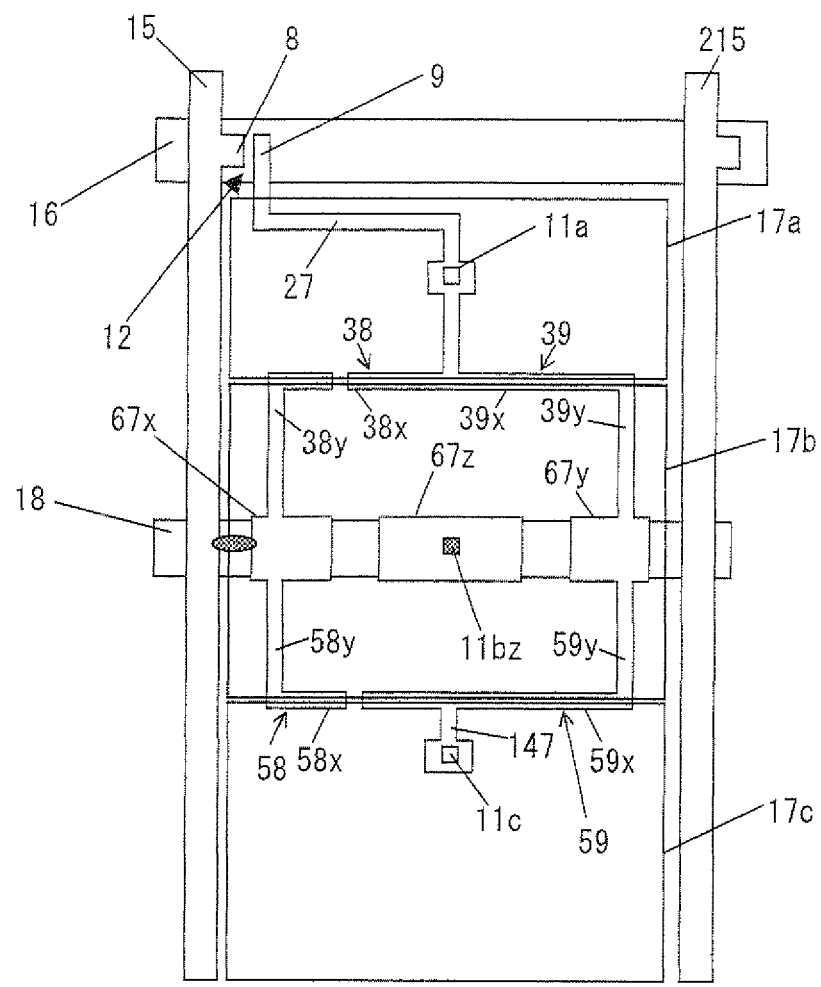
FIG. 27 is a plane drawing showing a modification example of the liquid crystal panel shown in FIG. 26.

For example, if a short-circuit between the first capacitor electrode 67x and the data signal line 15 occurs, cutting the first connection line 38 and the third connection line 58 with laser (e.g. third higher harmonic wave 355 nm of YAG laser) allows normally controlling potentials of the first-third pixel electrodes 17a-17c (normally driving three sub-pixels) (see FIG. 27).

The present configuration is such that four connection lines (38, 39, 58, 59) are connected via the first and second capacitor electrodes 67x and 67y in a ring-shaped manner, which assures a redundancy effect against breakage of the line. Further, the two lateral extensions 38x and 39x positioned under the gap between the first pixel electrode 17a and the second pixel electrode 17b and the two lateral extensions 58x and 59x positioned under the gap between the second pixel electrode 17b and the third pixel electrode 17c may double as light-shielding members for preventing leakage of light. Since a coupling capacitance is formed at a portion where four connection lines (38, 39, 58, 59) and the pixel electrode 17b overlap, the first capacitor electrode 67x and the second capacitor electrode 67y can be made small in proportion to the increased overlapping area. This increases (or maintains) an open area ratio.

Figure 28:
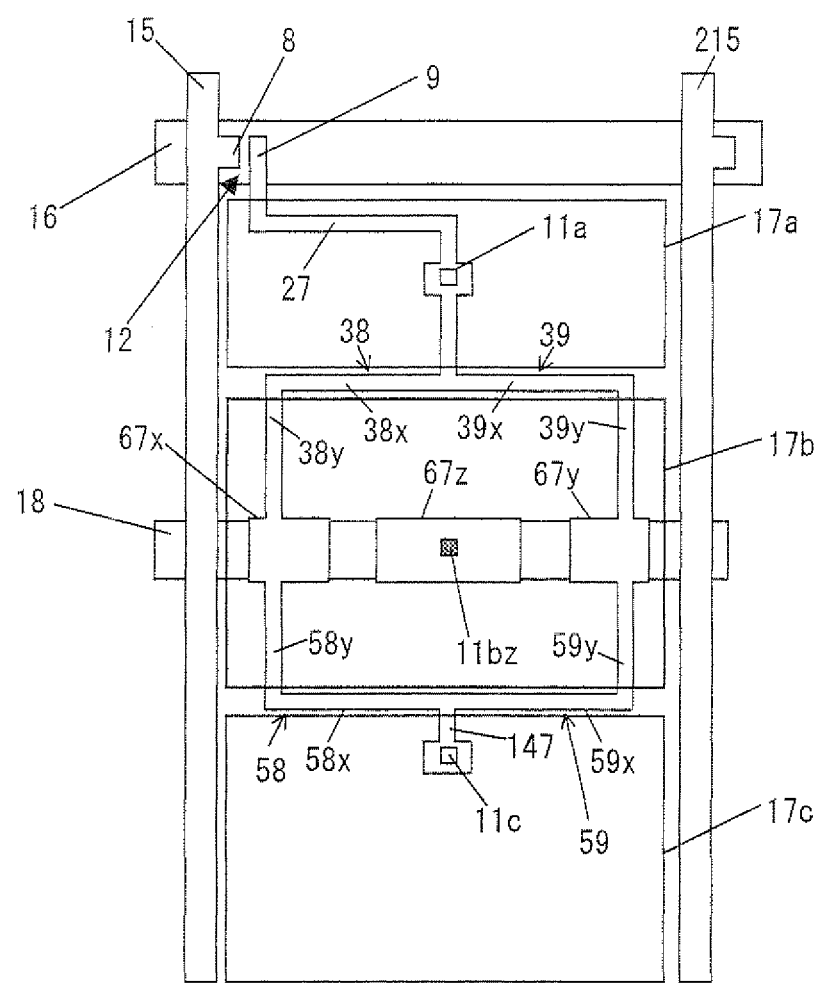
FIG. 28 is a plane drawing showing a modification example of the liquid crystal panel shown in FIG. 26.

The liquid crystal panel in FIG. 26 may be modified to be a one shown in FIG. 28. The liquid crystal panel in FIG. 28 is configured such that each of the lateral extension 38x of the first connection line 38, the lateral extension 39x of the second connection line 39, the lateral extension 58x of the third connection line 58, and the lateral extension 59x of the fourth connection line 59 is positioned completely under a gap between pixel electrodes. This configuration is advantageous in that when cutting connection lines with laser, a short-circuit between a connection line to be cut and the second pixel electrode 17b is less likely to occur.

Figure 29:
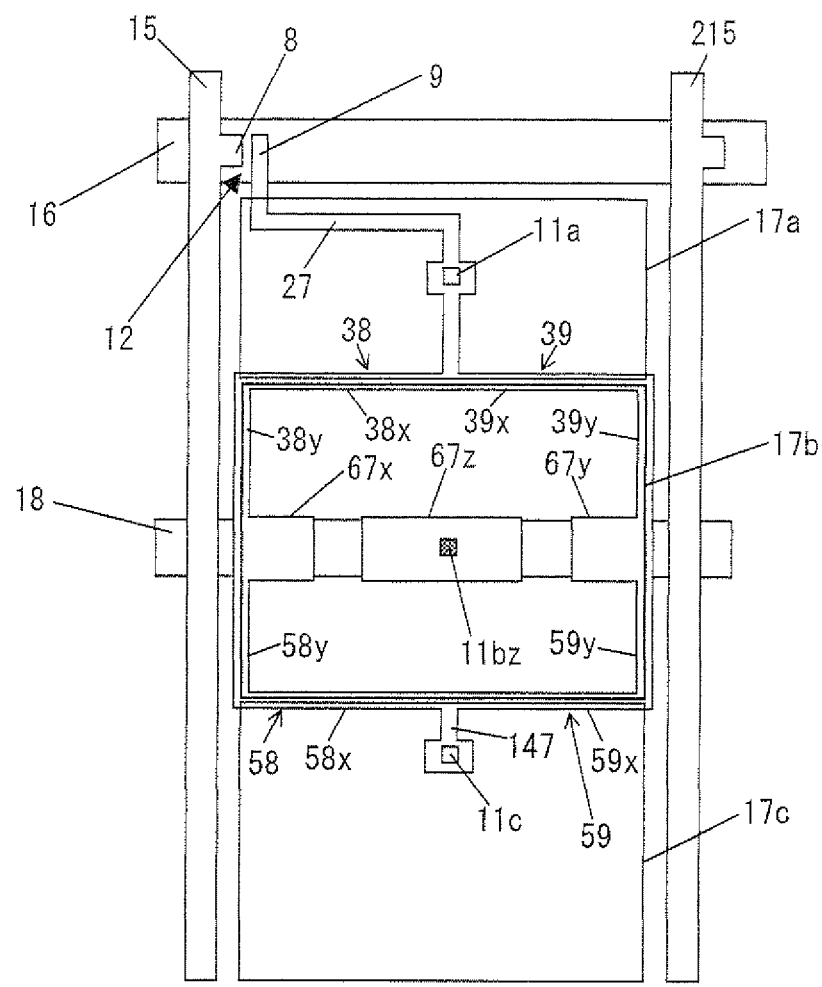
FIG. 29 is a plane drawing showing a modification example of the liquid crystal panel shown in FIG. 26.

The liquid crystal panel in FIG. 26 may be modified to be a one as shown in FIG. 29. The liquid crystal panel in FIG. 29 is configured such that the longitudinal extension 38y of the first connection line 38 and the longitudinal extension 58y of the third connection line 58 are positioned to overlap an edge of the second pixel electrode 17b which edge is along the data signal line 15, and the longitudinal extension 39y of the second connection line 39 and the longitudinal extension 59y of the fourth connection line 59 are positioned to overlap an edge of the second pixel electrode 17b which edge is along the data signal line 215. This configuration allows preventing leakage of light from between the data signal line (15, 215) and the pixel electrode (17b), causing black matrices on the CF substrate to be thin at portions on the data signal lines. This increases an open area ratio.

Figure 30:
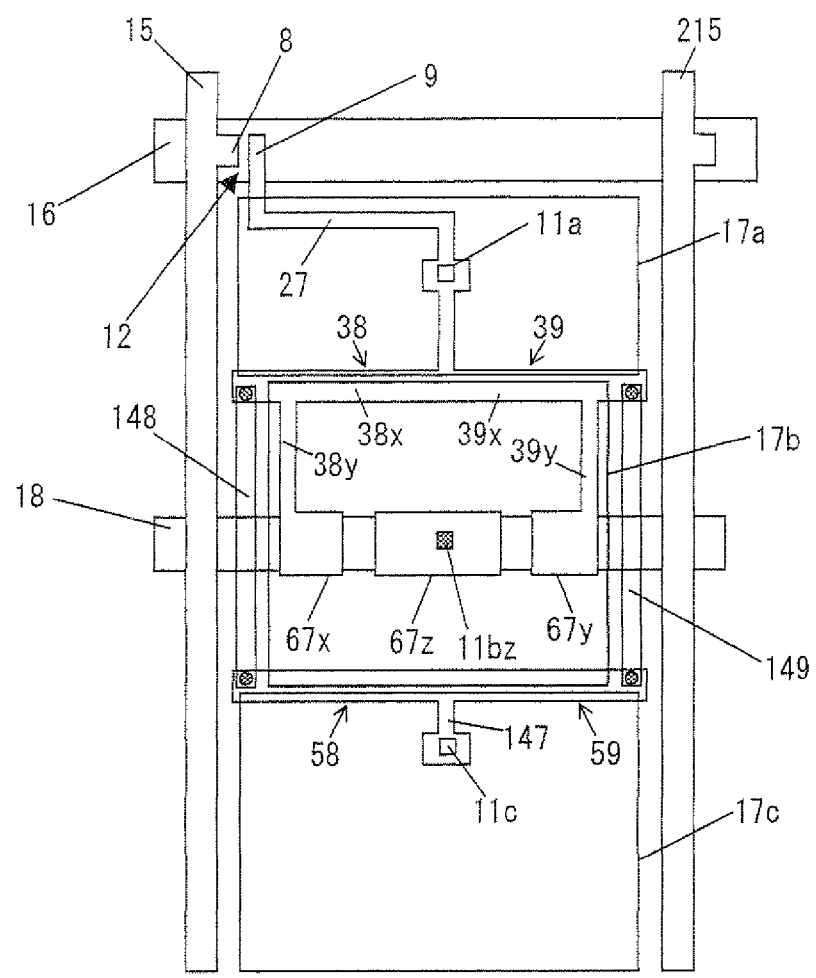
FIG. 30 is a plane drawing showing a modification example of the liquid crystal panel shown in FIG. 29.

Further, the liquid crystal panel in FIG. 26 may be modified to be a one shown in FIG. 30. The liquid crystal panel shown in FIG. 30 is configured as follows. A first connection line 38 has a T-shape, and consists of: a lateral extension 38x which extends in the same direction as the scanning signal line 16; and a longitudinal extension 38y which extends in the same direction as the data signal line 15. Further, a second connection line 39 has a T-shape, and consists of: a lateral extension 39x which extends in the same direction as the scanning signal line 16; and a longitudinal extension 39y which extends in the same direction as the data signal line 215. Further, the lateral extension 38x of the first connection line 38 is connected with a drain extraction line 27, and the longitudinal extension 38y is connected with a first capacitor electrode 67x. Further, the lateral extension 39x of the second connection line 39 is connected with a drain extraction line 27, and the longitudinal extension 39y is connected with a second capacitor electrode 67y. Further, a third connection line 58 consists only of a lateral extension which overlaps a gap between the second pixel electrode 17b and the third pixel electrode 17c. A fourth connection line 59 consists only of a lateral extension which overlaps this gap. Each of the third and fourth connection lines 58 and 59 is connected with an intermediate line 147. The intermediate line 147 is connected with the third pixel electrode 17c via a contact hole 11c.

Further, a bridge electrode 148 made of the same material (made in the same process) as other pixel electrodes is provided to be along the data signal line 15 on a plane view. One end of the bridge electrode 148 is connected with the lateral extension 38x of the first connection line 38 via a contact hole, and the other end of the bridge electrode 148 is connected with the third connection line 58 via a contact hole. Further, a bridge electrode 149 made of the same material (made in the same process) as other pixel electrodes is provided to be along the data signal line 215 on a plane view. One end of the bridge electrode 149 is connected with the lateral extension 39x of the second connection line 39 via a contact hole, and the other end of the bridge electrode 149 is connected with the fourth connection line 59 via a contact hole.

With this configuration, the bridge electrodes 148 and 149 prevent electric charge from coming from the data signal lines 15 and 215 into the second pixel electrode 17b which is electrically floating. This allows preventing image sticking of the sub-pixel including the pixel electrode 17b.

Figure 31:
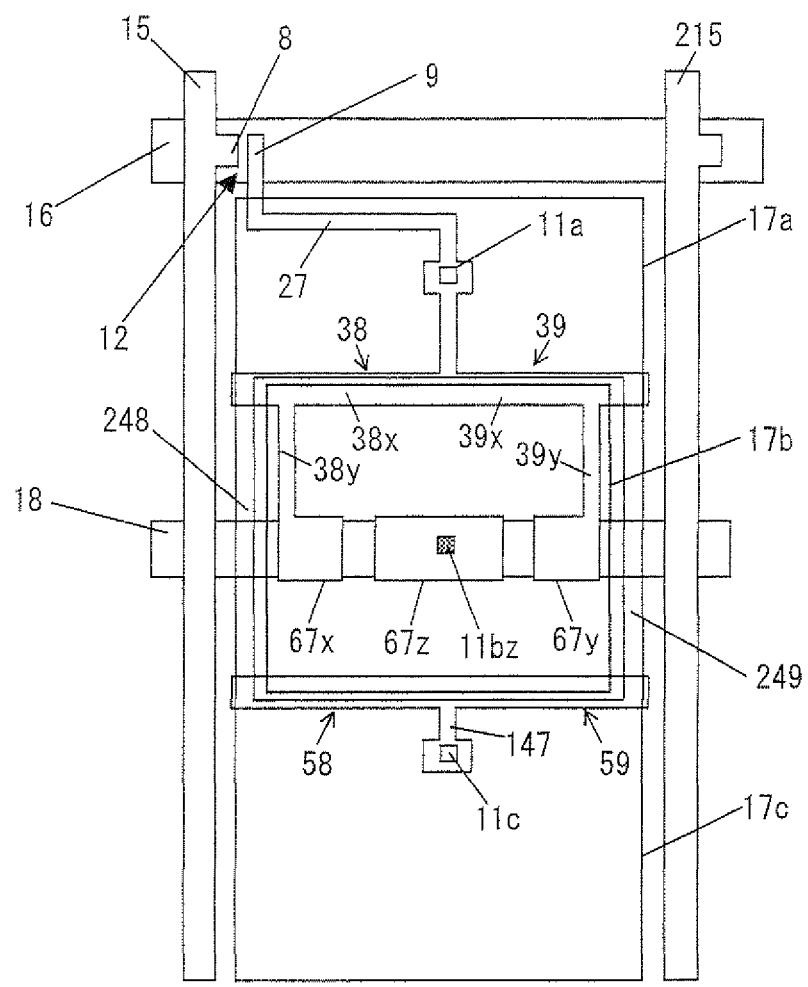
FIG. 31 is a plane drawing showing a modification example of the liquid crystal panel shown in FIG. 30.

The bridge lines 148 and 149 in FIG. 30 may be formed integrally with the pixel electrodes 17a and 17c. In this case, as shown in FIG. 31, one end of a bridge electrode 248 which is along the data signal line 15 on a plane view is connected with the first pixel electrode 17a on the same layer where both the bridge electrode 248 and the first pixel electrode 17a are provided, and the other end of the bridge electrode 248 is connected with the third pixel electrode 17c on the same layer where both the bridge electrode 248 and the third pixel electrode 17c are provided. Further, one end of a bridge electrode 249 which is along the data signal line 215 on a plane view is connected with the first pixel electrode 17a on the same layer where both the bridge electrode 249 and the first pixel electrode 17a are provided, and the other end of the bridge electrode 249 is connected with the third pixel electrode 17c on the same layer where both the bridge electrode 249 and the third pixel electrode 17c are provided. This configuration has reduced number of contact holes compared with the configuration in FIG. 30.

In each of the above configurations, the channel protecting film (insulating film between the data signal line and the pixel electrode) may be made only of an inorganic interlayer insulating film, or may be made of both an inorganic insulating film and an organic interlayer insulating film thicker than the inorganic interlayer insulating film. In the latter case, it is preferable to design the channel protecting film such that a portion of the organic interlayer insulating film which portion overlaps the first capacitor electrode 67x and the second pixel electrode 17b and a portion of the organic interlayer insulating film which portion overlaps the second capacitor electrode 67y and the second pixel electrode 17b are removed or made thinner than its surroundings. This allows increasing coupling capacitance between the first and third pixel electrodes 17a and 17c and the second pixel electrode 17b while securing the effect yielded by designing the channel protecting film to be thick.

FIG. 37 is a plane drawing showing another configuration of the liquid crystal panel of the present invention. An active matrix substrate of a liquid crystal panel shown in FIG. 37 includes transistors 112 and 212 each connected with a scanning signal line 16 and a transistor 312 connected with a scanning signal line 116 which is next to the scanning signal line 16. One pixel region includes pixel electrodes 17a and 17b, four capacitor electrodes 266x, 266y, 267x, and 267y, and a connection line 238 connecting the capacitor electrodes 267x and 267y. Here, each of the capacitor electrodes 266x, 266y, 267x, and 267y overlaps a retention capacitor line 18 via a gate insulating film, and overlaps the pixel electrode 17b via a channel protecting film (an inorganic interlayer insulating film or a laminate film of an inorganic interlayer insulating film and an organic interlayer insulating film). A drain electrode 308 of the transistor 312 is connected with the capacitor electrode 267x via an extracting line 227, and a source electrode 309 of the transistor 312 is connected with the pixel electrode 17a via a contact hole. The connection line 238 is positioned such that at least a part thereof does not overlap the retention capacitor line 18. Further, a common source electrode 128 of the transistors 112 and 212 is connected with the data signal line 15, a drain electrode 109 of the transistor 112 is connected with the capacitor electrode 266x via an extracting line 127p, the capacitor electrode 266x is connected with the pixel electrode 17a via a drain extracting line 127q and a contact hole, and the capacitor electrode 266y is connected with the pixel electrode 17b via a contact hole. The drain electrode 209 of the transistor 212 is connected with the pixel electrode 17b via a contact hole. Here, a retention capacitor between the pixel electrode 17a and the retention capacitor line 18 is formed at a portion where the capacitor electrode 266x and the retention capacitor line 18 overlap each other, a retention capacitor between the pixel electrode 17b and the retention capacitor line 18 is formed at a portion where the capacitor electrode 266y and the retention capacitor line 18 overlap each other, and a retention capacitor between the pixel electrode 17a and the pixel electrode 17b is formed at a portion where the capacitor electrodes 267x and 267y overlap the pixel electrode 17b.

Assume that the liquid crystal panel shown in FIG. 37 is driven. When the scanning signal line 16 is scanned, the same data signal potential is written in the pixel electrodes 17a and 17b. When (next) scanning signal line 116 is scanned, the pixel electrodes 17a and 17b are connected with each other via a capacitor. Consequently, the pixel electrode 17a serves as a dark sub-pixel and the pixel electrode 17b serves as a bright sub-pixel. Even if a short-circuit between the capacitor electrode 267y and the data signal line 115 occurs, cutting the connection line 238 at a portion which does not overlap the retention capacitor line 18 allows maintaining capacitive coupling between the pixel electrode 17a and the pixel electrode 17b (causing the pixel electrode 17a to serve as a dark sub-pixel and the pixel electrode 17b to serve as a bright sub-pixel).

In the present embodiment, the liquid crystal display unit and the liquid crystal display device of the present invention are configured as follows. That is, to either side of the liquid crystal panel of the present invention, two polarization plates A and B are combined so that polarization axes of the polarization plates A and B intersect at right angles to each other. Furthermore, an optical compensation sheet or the like may be laminated on the polarization plate if necessary. Next, as shown in (a) of FIG. 32, drivers (a gate driver 202 and a source driver 201) are connected. The following description explains a connection by a TCP (Tape Career Package) method as one example. First, an ACF (Anisotoropic Conductive Film) is temporarily pressed on a terminal section of the liquid crystal panel. Next, a TCP in which the drivers are loaded is punched out from a carrier tape. The TCP is aligned to a panel terminal electrode, and is heated and finally pressed. Thereafter, a circuit substrate 209 (PWB: Printed wiring board) for connecting the drivers TCP together and an input terminal of the TCP are connected together with the ACF. With this, a liquid crystal display unit 200 is provided. Thereafter, as shown in (b) of FIG. 32, a display control circuit 209 is connected to the drivers (201 and 202) of the liquid crystal display unit via a circuit board 203. By integrating the liquid crystal display unit 200 and the display control circuit 209 with an illumination device (backlight unit) 204, a liquid crystal display device 210 is provided.

FIG. 33 is a block diagram showing a configuration of a liquid crystal display device of the present invention. As shown in the drawing, the liquid crystal display device of the present invention includes a display section (liquid crystal panel), a source driver (SD), a gate driver (GD), and a display control circuit. The source driver drives a gate signal line, a gate driver drives a scanning signal line, and a display control circuit controls the source driver and the gate driver.

The display control circuit receives, from an outside signal source (e.g. tuner), a digital video signal Dv indicative of an image to be displayed; a horizontal sync signal HSY and a vertical sync signal VSY each corresponding to the digital video signal Dv; and a control signal Dc for controlling display operation. Further, the control circuit generates, based on the signals Dv, HSY, VSY, and Dc thus received, a data start pulse signal SSP, a data clock signal SCK, a digital image signal DA indicative of an image to be displayed (signal corresponding to video signal Dv), a gate start pulse signal GSP, a gate clock signal GCK, and a gate driver output control signal (scanning signal output control signal) GCSE, each serving as a signal for enabling a display section to display an image indicated by the digital video signal Dv, and the display control circuit outputs these signals.

To be more specific, the video signal Dv is subjected to timing adjustment etc. in an internal memory if necessary and then outputted as the digital image signal DA from the display control circuit. The data clock signal SCK is generated as a signal consisting of pulses corresponding to pixels of an image indicated by the digital image signal DA. The data start pulse signal SSP is generated, based on the horizontal sync signal HSY, as a signal which has a high (H) level only during a predetermined period with respect to each horizontal scanning period. The gate start pulse signal GSP is generated, based on the vertical sync signal VSY, as a signal which has a H level only during a predetermined period with respect to each frame period (each vertical scanning period). The gate clock signal GCK is generated based on the horizontal sync signal HSY. The gate driver output control signal GOE is generated based on the horizontal sync signal HSY and the control signal Dc.

Among the signals thus generated by the display control circuit, the digital image signal DA, the polarity inversion signal POL for controlling a signal potential (data signal potential), the data start pulse signal SSP, and the data clock signal SCK are input to the source driver, and the gate start pulse signal GSP, the gate clock signal GCK, and the gate driver output control signal GOE are input to the gate driver.

Based on the digital image signal DA, the data clock signal SCK, the data start pulse signal SSP, and the polarity inversion signal POL, the source driver sequentially generates analog voltages (signal voltages) corresponding to pixel values in each scanning signal line of an image represented by the digital image signal DA, and outputs these data signals to data signal lines, respectively.

Based on the gate start pulse signal GSP, the gate clock signal GCK, and the gate driver output control signal GOE, the gate driver generates gate-on pulses and outputs the gate-on pulses to the scanning signal lines, respectively, so as to selectively drive the scanning signal lines.

As described above, the source driver and the gate driver drive the data signal lines and the scanning signal lines of the display section (liquid crystal panel), so that a signal potential is written into a pixel electrode from a data signal line via a transistor (TFT) connected with the selected scanning signal line. Thus, in individual sub-pixels, a voltage is applied to the liquid crystal layer, and application of the voltage controls transmittance of light from the backlight, enabling the sub-pixels to display an image indicated by the digital video signal Dv.

Next, the following explains one example of configuration of applying the liquid crystal display device according to the present invention to a television receiver. FIG. 34 is a block diagram showing a configuration of a display device 800 for a television receiver. The display device 800 includes a liquid crystal display unit 84, a Y/C separation circuit 80, a video chroma circuit 81, an A/D converter 82, a liquid crystal controller 83, a backlight drive circuit 85, a backlight 86, a microcomputer 87, and a gradation circuit 89. The liquid crystal display unit 84 includes: a liquid crystal panel; and a source driver and a gate driver each for driving the liquid crystal panel.

In the display device 800 of the aforementioned configuration, a complex color video signal Scv as a television signal is inputted from the outside to the Y/C separation circuit 80. In the Y/C separation circuit 80, the complex color video signal Scv is separated into a luminance signal and a color signal. The luminance signal and the color signal are converted to analog RGB signals corresponding to three primary colors of light in the video chroma circuit 81. Further, the analog ROB signals are converted to digital RGB signals by the A/D converter 82. The digital RGB signals are inputted to the liquid crystal controller 83. Moreover, in the Y/C separation circuit 80, horizontal and vertical sync signals are extracted from the complex color video signal Scv inputted from the outside. These sync signals are also inputted to the liquid crystal controller 83 via the microcomputer 87.

The liquid crystal display unit 84 receives, from the liquid crystal controller 83, the digital RGB signals as well as timing signals based on the sync signals with predetermined timing. Further, the gradation circuit 89 generates gradation potentials corresponding to three primary colors R, G, and B for color display, and supplies the gradation potentials to the liquid crystal display unit 84. In the liquid crystal display unit 84, drive signals (data signals=signal potentials, scanning signals etc.) are generated by source driver, gate driver etc. in the liquid crystal display unit 84 in accordance with the RGB signals, the timing signals, and the gradation potentials, and a color image is displayed by a liquid crystal panel in the liquid crystal display unit 84. In order to enable the liquid crystal display unit 84 to display an image, it is necessary to emit light from the backside of the liquid crystal panel in the liquid crystal display unit. In the liquid crystal display 800, under control of the microcomputer 87, the backlight drive circuit 85 drives the backlight 86 so as to emit light to the backside of the liquid crystal panel. Control of the whole system, including the aforementioned processes is carried out by the microcomputer 87. As the video signal (complex color video signal) inputted from the outside, not only a video signal in accordance with television broadcast but also a video signal picked up by a camera or supplied via the Internet line is also usable. In the liquid crystal display 800, image display in accordance with various video signals can be performed.

In displaying an image by the liquid crystal display device 800 in accordance with television broadcast, a tuner section 90 is connected to the liquid crystal display device 800 as shown in FIG. 35 so that a television receiver 701 of the present invention is provided. The tuner section 90 extracts a channel signal to be received from waves (high-frequency signals) received by an antenna (not illustrated), and converts the channel signal to an intermediate frequency signal. The tuner section 90 detects the intermediate frequency signal, thereby extracting the complex color video signal Scv as the television signal. The complex color video signal Scv is inputted to the display device 800 as described above and an image is displayed by the display device 800 in accordance with the complex color video signal Scv.

FIG. 36 is an exploded perspective view showing one example of a configuration of the television receiver of the present invention. As shown in FIG. 36, the present television receiver 701 includes, as constituent features thereof, a first housing 801 and a second housing 806 in addition to the display device 800. The liquid crystal display device 800 is arranged such that the first and second housings 801 and 806 hold the display device 800 so as to wrap therein the display device 800. The first housing 801 has an opening 801a for transmitting an image displayed on the liquid crystal display device 800. On the other hand, the second housing 806 covers a back side of the liquid crystal display device 800. The second housing 806 is provided with an operating circuit 805 for operating the display device 800. The second housing 806 is further provided with a supporting member 808 therebelow.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The active matrix substrate of the present invention and the liquid crystal panel including the active matrix substrate are preferably applicable to a liquid crystal television for example.

REFERENCE SIGNS LIST

101-104: pixel
12: transistor
15: data signal line

16: scanning signal line
17a-17c: first-third pixel electrodes
18: retention capacitor line
21: organic gate insulating film
22: inorganic gate insulating film
25: inorganic interlayer insulating film
26: organic interlayer insulating film
38: first connection line
39: second connection line
58: third connection line
59: fourth connection line
67x-67z: first-third capacitor electrodes
84: liquid crystal display unit
701: television receiver
800: liquid crystal display device

The invention claimed is:

1. An active matrix substrate, comprising a scanning signal line extending in a row direction, a data signal line extending in a column direction, a transistor connected with the scanning signal line and the data signal line, and a retention capacitor line,
    each pixel region including a first pixel electrode, a second pixel electrode, a first capacitor electrode, a second capacitor electrode, a first connection line, and a second connection line, each of the first capacitor electrode and the second capacitor electrode being positioned on a layer where the data signal line is positioned, the first connection line being connected with the first capacitor electrode, and the second connection line being connected with the second capacitor electrode,
    the first capacitor electrode and the second capacitor electrode being aligned in the row direction in such a manner as to overlap the retention capacitor line via a first insulating film and to overlap the second pixel electrode via a second insulating film,
    one conductive electrode of the transistor, the first pixel electrode, the first connection line, and the second connection line being electrically connected with one another, and
    at least a part of the first connection line and at least a part of the second connection line not overlapping the retention capacitor line.

2. The active matrix substrate as set forth in claim 1, wherein
    in said each pixel region, a third capacitor electrode electrically connected with the second pixel electrode is positioned in such a manner as to overlap the retention capacitor line, and
    the first capacitor electrode, the second capacitor electrode, and the third capacitor electrode are aligned in this order along the row direction.

3. The active matrix substrate as set forth in claim 2, further comprising an extracted line extracted from said one conductive electrode of the transistor, and
    the extracted line being connected with the first pixel electrode via a contact hole, the extracted line being connected with the first connection line and the second connection line on a layer where the extracted line, the first connection line, and the second connection line are positioned, and the third capacitor electrode being connected with the second pixel electrode via a contact hole.

4. The active matrix substrate as set forth in claim 1, wherein at least one of the first connection line and the second connection line overlaps a gap between the first pixel electrode and the second pixel electrode.

5. The active matrix substrate as set forth in claim 1, wherein the second insulating film is an interlayer insulating film which covers a channel of the transistor.

6. The active matrix substrate as set forth in claim 5, wherein
    the interlayer insulating film is designed such that at least a part of a portion overlapping the first capacitor electrode and the second pixel electrode and at least a part of a portion overlapping the second capacitor electrode and the second pixel electrode are thin.

7. The active matrix substrate as set forth in claim 6, wherein
    the interlayer insulating film includes an inorganic interlayer insulating film and an organic interlayer insulating film, and
    said at least a part of a portion overlapping the first capacitor electrode and the second pixel electrode and said at least a part of a portion overlapping the second capacitor electrode and the second pixel electrode are designed such that the organic interlayer insulating film is thinned or the organic interlayer insulating film is removed.

8. The active matrix substrate as set forth in claim 1, wherein the first insulating film is a gate insulating film.

9. The active matrix substrate as set forth in claim 8, wherein the gate insulating film is designed such that at least a part of a portion overlapping the retention capacitor line and the first capacitor electrode, at least a part of a portion overlapping the retention capacitor line and the second capacitor electrode, and at least a part of a portion overlapping the retention capacitor line and the third capacitor electrode are thin.

10. The active matrix substrate as set forth in claim 9, wherein
    the gate insulating film includes an organic gate insulating film and an inorganic gate insulating film, and
    said at least a part of a portion overlapping the retention capacitor line and the first capacitor electrode, said at least a part of a portion overlapping the retention capacitor line and the second capacitor electrode, and said at least a part of a portion overlapping the retention capacitor line and the third capacitor electrode are designed such that the organic gate insulating film is thin or the organic gate insulating film is removed.

11. The active matrix substrate as set forth in claim 6, wherein
    the first pixel electrode and the scanning signal line partially overlap each other.

12. The active matrix substrate as set forth in claim 1, further comprising a retention capacitor extension,
    on a plane view, the retention capacitor extension extending from the retention capacitor line along the data signal line in such a manner as to overlap an edge of the second pixel electrode or run outside the edge.

13. The active matrix substrate as set forth in claim 1, wherein a gap between the first pixel electrode and the second pixel electrode serves as a structure for controlling alignment.

14. The active matrix substrate as set forth in claim 1, wherein said each pixel region includes a third pixel electrode, and the third pixel electrode is electrically connected with the first pixel electrode.

15. The active matrix substrate as set forth in claim 14, wherein the first pixel electrode, the second pixel electrode, and the third pixel electrode are aligned in this order along the column direction.

16. The active matrix substrate as set forth in claim 1, wherein
in said each pixel region, a third capacitor electrode electrically connected with the second pixel electrode is positioned in such a manner as to overlap the retention capacitor line, and
the first capacitor electrode, the third capacitor electrode, and the second capacitor electrode are aligned in this order along the row direction.

17. The active matrix substrate as set forth in claim 16, wherein
said each pixel region includes a third connection line connected with the first capacitor electrode and a fourth connection line connected with the second capacitor electrode, and
the first connection line and the second connection line are connected with each other, and the third connection line and the fourth connection line are connected with each other.

18. The active matrix substrate as set forth in claim 17, wherein
said each pixel region includes a third pixel electrode, and the first pixel electrode, the second pixel electrode, and the third pixel electrode are aligned in this order along the column direction,
the third connection line and the fourth connection line are electrically connected with the third pixel electrode, and
the first connection line and the second connection line each partially overlap a gap between the first pixel electrode and the second pixel electrode, and the third connection line and the fourth connection line each partially overlap a gap between the second pixel electrode and the third pixel electrode.

19. The active matrix substrate as set forth in claim 17, wherein
said each pixel region includes a third pixel electrode, and the first pixel electrode, the second pixel electrode, and the third pixel electrode are aligned in this order along the column direction,
the third connection line and the fourth connection line are electrically connected with the third pixel electrode, and
the first connection line and the third connection line each partially overlap one of two edges of the second pixel electrode which edges are along the data signal line, and the second connection line and the fourth connection line each partially overlap the other of the two edges.

20. A liquid crystal panel, comprising an active matrix substrate as set forth in claim 6 and a counter substrate facing the active matrix substrate,
the counter substrate having a convexity on its surface, the convexity facing a region of the active matrix substrate where the interlayer insulating film is thin.

21. A liquid crystal panel, comprising an active matrix substrate as set forth in claim 9 and a counter substrate facing the active matrix substrate,
the counter substrate having a convexity on its surface, the convexity facing a region of the active matrix substrate where the gate insulating film is thin.

22. The liquid crystal panel as set forth in claim 20, wherein the retention capacitor line extends in the row direction, and
when the convexity of the surface of the counter substrate is projected onto a layer where the retention capacitor line is provided, the projected convexity is positioned between two edges of the retention capacitor line in the row direction.

23. The liquid crystal panel as set forth in claim 20, wherein the counter substrate has ribs for controlling alignment, and
the counter substrate is provided with a protruding member at a portion facing the region of the active matrix substrate where the interlayer insulating film is thin, the protruding member being made of a same material as the ribs.

24. The liquid crystal panel as set forth in claim 20, wherein the counter substrate is a color filter substrate, and
the counter substrate is provided with a protruding member at a portion facing the region of the active matrix substrate where the interlayer insulating film is thin, the protruding member being made of a same material as a colored layer.

25. A liquid crystal panel, comprising an active matrix substrate as set forth in claim 1.

26. A liquid crystal display unit, comprising a liquid crystal panel as set forth in claim 20 and a driver.

27. A liquid crystal display device, comprising a liquid crystal display unit as set forth in claim 26 and a light source device.

28. A television receiver, comprising a liquid crystal display device as set forth in claim 1 and a tuner section for receiving television broadcasting.

29. A method for producing an active matrix substrate including a scanning signal line extending in a row direction, a data signal line extending in a column direction, a transistor connected with the scanning signal line and the data signal line, and a retention capacitor line,
the method comprising the steps of:
(i) forming, in each pixel region, a first pixel electrode, a second pixel electrode, a first capacitor electrode, and a second capacitor electrode in such a manner that (a) the first capacitor electrode and the second capacitor electrode are positioned on a layer where the data signal line is positioned, (b) the first capacitor electrode and the second capacitor electrode are aligned in the row direction to overlap the retention capacitor line via a first insulating film and to overlap the second pixel electrode via a second insulating film, (c) one conductive electrode of the transistor, the first pixel electrode, a first connection line connected with the first capacitor electrode, and a second connection line connected with the second capacitor electrode are electrically connected with one another, and (d) at least a part of the first connection line and at least a part of the second connection line do not overlap the retention capacitor line; and
(ii) cutting the first connection line if a short-circuit between the first capacitor electrode and the data signal line occurs, and cutting the second connection line if a short-circuit between the second capacitor electrode and the data signal line occurs.

30. The method as set forth in claim 29, wherein
in the step (i), a third capacitor electrode is formed in such a manner that the third capacitor electrode is connected with the second pixel electrode via a contact hole, the third capacitor electrode overlaps the retention capacitor line, and the first capacitor electrode, the second capacitor electrode, and the third capacitor electrode are aligned in this order in the row direction, and
if a short-circuit between the third capacitor electrode and the data signal line occurs, a portion of the second pixel electrode which portion is in the contact hole is removed.

31. An active matrix substrate, comprising a scanning signal line, a transistor connected with the scanning signal line, and a retention capacitor line,
- each pixel region including a first pixel electrode, a second pixel electrode, a first capacitor electrode, a second capacitor electrode, and a connection line connecting the first capacitor electrode and the second capacitor electrode,
- the first capacitor electrode and the second capacitor electrode each overlapping the retention capacitor line via a first insulating film and overlapping the second pixel electrode via a second insulating film,
- one conductive electrode of the transistor being electrically connected with the connection line, and said one conductive electrode or the other conductive electrode of the transistor being electrically connected with the first pixel electrode, and
- at least a part of the connection line not overlapping the retention capacitor line.

* * * * *

UNITED STATES PATENT AND TRADEMARK OFFICE
CERTIFICATE OF CORRECTION

PATENT NO. : 8,411,216 B2  
APPLICATION NO. : 13/060494  
DATED : April 2, 2013  
INVENTOR(S) : Tsubata Page 1 of 1

It is certified that error appears in the above-identified patent and that said Letters Patent is hereby corrected as shown below:

On the Title page, please correct the Assignee address (73) to read as follows:

(73) Assignee: Sharp Kabushiki Kaisha, Osaka-shi, Osaka (JP)

Signed and Sealed this  
Twenty-fourth Day of September, 2013

Teresa Stanek Rea  
*Deputy Director of the United States Patent and Trademark Office*